(12) United States Patent
Maruyama et al.

(10) Patent No.: US 9,928,012 B2
(45) Date of Patent: Mar. 27, 2018

(54) INFORMATION PROCESSING APPARATUS, INFORMATION PROCESSING SERVER AND PRINT SETTING DISPLAY METHOD

(71) Applicant: Oki Data Corporation, Tokyo (JP)

(72) Inventors: Kazuki Maruyama, Tokyo (JP); Satoshi Yumita, Tokyo (JP)

(73) Assignee: Oki Data Corporation, Tokyo (JP)

(*) Notice: Subject to any disclaimer, the term of this patent is extended or adjusted under 35 U.S.C. 154(b) by 0 days.

(21) Appl. No.: 15/213,657

(22) Filed: Jul. 19, 2016

(65) Prior Publication Data
US 2017/0052743 A1    Feb. 23, 2017

(30) Foreign Application Priority Data

Aug. 18, 2015   (JP) .................................. 2015-160761

(51) Int. Cl.
*G06F 3/12*    (2006.01)
*H04N 1/00*    (2006.01)
*G06F 3/0483*    (2013.01)
*G06F 3/0482*    (2013.01)
*G06F 3/0484*    (2013.01)

(52) U.S. Cl.
CPC .......... *G06F 3/1205* (2013.01); *G06F 3/0482* (2013.01); *G06F 3/0483* (2013.01); *G06F 3/04847* (2013.01); *G06F 3/1256* (2013.01); *G06F 3/1285* (2013.01); *H04N 1/00416* (2013.01)

(58) Field of Classification Search
CPC ..................................................... G06F 3/1205
USPC ........................................................ 358/1.13
See application file for complete search history.

(56) References Cited

U.S. PATENT DOCUMENTS

2007/0229491 A1* 10/2007 Saitoh ................ H04N 1/00413
                                                    345/418
2013/0335775 A1* 12/2013 Oonami ................ G06F 3/1256
                                                    358/1.15
2014/0009776 A1* 1/2014 Suzuki ............... G06K 15/1807
                                                    358/1.13

FOREIGN PATENT DOCUMENTS

JP         2014002496 A      1/2014

* cited by examiner

*Primary Examiner* — Jacky X Zheng
(74) *Attorney, Agent, or Firm* — Muncy, Geissler, Olds & Lowe, P.C.

(57) ABSTRACT

An information processing apparatus having a printer driver includes a display part that displays on a screen a first image, a second image, a first setting item that relates to the first image and a second setting item that relates to the second image, a control part that determines one of the first and second images as a main image and the other of them as a sub image, displays both of the main and sub images on the screen, and receives a selection made by a user of the apparatus, and a display switching part that displays the first image as the main image relating to the first setting item when the first setting item is selected by the user, and the second image as the sub image.

10 Claims, 17 Drawing Sheets

Fig. 3

| Tab Info. | Tab A | Tab B | Tab C | |
|---|---|---|---|---|
| Print Setting Item | Sheet Feeding Method | Resolution | Layout | Print Method |
| | | No. of Print | Layout·Print Method | Binding Direction |
| Image | Tray 1 Main | Resolution — Normal Resl. Main | Normal Print Main | S-Side Print Main |
| | Tray 2 Main | Resolution — Excel. Resl. Main | 2-UP Main | D-Side Print Main |
| | Tray 1 Sub | Resolution — Normal Resl. Sub | Normal Print Sub | S-Side Print Sub |
| | Tray 2 Sub | Resolution — Excel. Resl. Sub | 2-UP Sub | D-Side Print Sub |
| | | No. of Copy 1 Main | 2-UP S-Side Main | T-Direction Main |
| | | No. of Copy 2 Main | 2-UP D-Side Main | L-Direction Main |
| | | No. of Copy 1 Sub | 2-UP S-Side Sub | T-Direction Sub |
| | | No. of Copy 2 Sub | 2-UP D-Side Sub | L-Direction Sub |

Labels: 123B-1 (Tab Info row), 123B-2, 123B-3, 123B (overall)

Column groupings: No. of Copy, Layout·Print Method, Binding Direction

INFORMATION PROCESSING APPARATUS, INFORMATION PROCESSING SERVER AND PRINT SETTING DISPLAY METHOD

CROSS REFERENCE TO RELATED APPLICATION

This application claims priority under 35 USC 119 to Japanese Patent Application No. 2015-160761 filed on Aug. 18, 2015, the entire contents which are incorporated herein by reference.

TECHNICAL FIELD

The present invention relates to a print setting program, a print setting display method, an information processing apparatus and an information processing server.

BACKGROUND

Conventionally, it is disclosed that, in an information processing apparatus, when a user uses a printer driver to change a print setting, an image corresponding to the change of the print setting is displayed on a UI (User Interface) screen of the printer driver.

RELATED ART

[Patent Document 1] Japanese Patent Laid-Open Publication No. 2014-002496.

However, in the conventional method, there is a problem that, even when the user has changed the print setting, it is not easy for the user to intuitively understand the change of the print setting.

The present invention has been accomplished in view of the above problem, and is intended to provide a print setting program, a print setting display method, an information processing apparatus and an information processing server that allow a user to easily understand a change of a print setting on a screen.

SUMMARY

An information processing apparatus having a printer driver disclosed in the application includes a display part that displays on a screen a first image, a second image, a first setting item that relates to the first image and a second setting item that relates to the second image, a control part that determines one of the first and second images as a main image and the other of them as a sub image, displays both of the main and sub images on the screen, and receives a selection made by a user of the apparatus, and a display switching part that displays the first image as the main image relating to the first setting item when the first setting item is selected by the user, and the second image as the sub image.

A display method by a printer driver that displays a first image, a second image, a first setting item that relates to the first image and a second setting item that relates to the second image on a screen disclosed in the application includes determining one of the first and second images as a main image and the other of them as a sub image, and both of the main and sub images being displayed on the screen, receiving a selection made by a user of the apparatus, and selecting the first image as the main image relating to the first setting item when the first setting item is selected by the user, and the second image as the sub image.

According to the print setting program, the print setting display method, the information processing apparatus and the information processing server of an embodiment of the present invention, a user can easily understand a change of a print setting on a screen.

BRIEF DESCRIPTIONS OF THE DRAWINGS

FIG. 3 illustrates an example of a library.

DETAILED DESCRIPTION OF THE EMBODIMENTS

Figure 1:
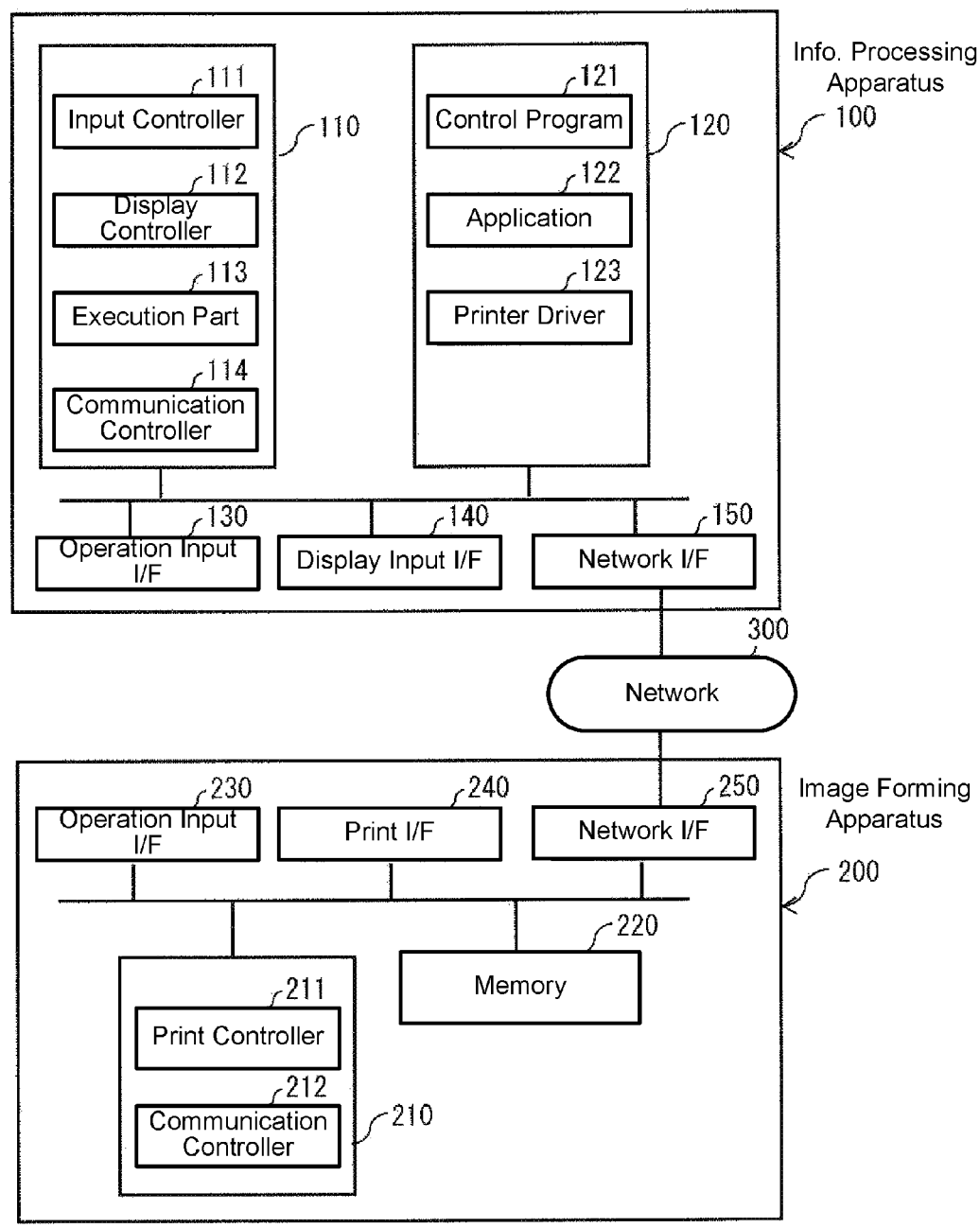
FIG. 1 illustrates an example of a schematic configuration of an image forming system.

In the following, an embodiment of the present invention is described in detail with reference to the drawings.

The following description is merely a specific example of the present invention, and the present invention is not limited to the following embodiment.

Further, the present invention is also not limited by arrangements, dimensions, dimensional ratios and the like of configuration elements illustrated in the drawings.

<1. Embodiment> [Configuration]

FIG. 1 illustrates an example of a schematic configuration of an image forming system. The image forming system includes an information processing apparatus 100 and an image forming apparatus 200. The information processing apparatus 100 is realized by a computer or a machine, and, for example, is formed by a personal computer or a portable terminal. The information processing apparatus 100 corresponds to a specific example of an "information processing apparatus" of the present invention. The image forming apparatus 200 is, for example, a printer. The image forming apparatus 200 corresponds to a specific example of an "image forming apparatus" of the present invention. The information processing apparatus 100 and the image forming apparatus 200 are connected to each other via a network 300. The network 300 is, for example, a communication line such a LAN or a WAN. The information processing apparatus 100 is configured to be able to communicate with the image forming apparatus 200 via the network 300. The image forming apparatus 200 is configured to be able to communicate with the information processing apparatus 100 via the network 300.

(Image Forming Apparatus 200)

The image forming apparatus 200 has a function of performing printing based on print data input from the information processing apparatus 100. The image forming apparatus 200 includes, for example, a controller 210, a memory 220, an operation input I/F 230, a print I/F 240 and a network I/F 250.

The network I/F 250 performs communication with an external device such as the information processing apparatus 100 via the network 300. The network I/F 250 forwards various requests (for example, a connection request and the like) received from the external device such as the information processing apparatus 100 to the controller 210. The network I/F 250 transmits various responses (for example, a connection response and the like) from the controller 210 to the external device such as the information processing apparatus 100. When print data is received from the external device such as the information processing apparatus 100, the network I/F 250 forwards the received print data to the controller 210. The memory 220 stores, for example, a program and data that are used during printing. Further, the memory 220 stores, for example, information (for example, the print data and the like) input from the external device such as the information processing apparatus 100. The operation input I/F 230 receives an input (for example, an execution instruction, a data input, or the like) from a user.

The controller 210 controls the entire image forming apparatus 200. The controller 210 receives various requests (for example, a connection request and the like) from the external device such as the information processing apparatus 100 via the network I/F 250. The controller 210 generates various response data (for example, a connection response and the like) according to requests from the external device such as the information processing apparatus 100. Herein, the response data generated by the controller each correspond to the requests from the external device(s). The controller 210 transmits the generated various responses via the network I/F 250 to the external device such as the information processing apparatus 100. The controller 210 receives print data from the external device such as the information processing apparatus 100 via the network I/F 250. The controller 210 further forwards the print data to the print I/F 240, and instructs the print I/F 240 to print based on the forwarded data. When a print instruction is received from the controller 210, the print I/F 240 generates image data based on the print data, and prints the generated image data.

(Information Processing Apparatus 100)

The information processing apparatus 100 includes a printer driver 123 for causing the information processing apparatus 100 to execute a series of operations that causes the image forming apparatus 200 to execute printing using a print function of the image forming apparatus 200. The information processing apparatus 100 includes, for example, a controller 110, a memory 120, an operation input I/F 130, a display output I/F 140 and a network I/F 150. The controller 110 corresponds to a specific example of a "first generation part" and a "second generation part" and "a control part" of the present invention. The memory 120 corresponds to a specific example of a "memory" of the present invention.

The network I/F 150 performs communication with the image forming apparatus 200 via the network 300. The network I/F 150 transmits various requests (for example, a connection request and the like) from the controller 110 to the image forming apparatus 200. When various responses (for example, a connection response and the like) are received from the image forming apparatus 200, the network I/F 150 forwards the received various responses (for example, a connection response and the like) to the controller 110. The display output I/F 140 is, for example, a display module. The display output I/F 140 displays a screen based on display screen data Id input from the controller 110. The display screen data Id corresponds to a specific example of "display screen data" of the present invention. The screen that is displayed by the display output I/F 140 will be described later.

The operation input I/F 130 receives an input (for example, an execution instruction, a data input or the like) from a user. For example, when a printer driver UI screen 400 (to be described later) is displayed in a screen of the display output I/F 140, the operation input I/F 130 receives a selection of an item in the printer driver UI screen 400 according to an input from a user. The "item in the printer driver UI screen 400" refers to, for example, an index tab or a print setting item. The operation input I/F 130 forwards the information input from the user to the controller 110. The printer display output I/F 140 is a correspondence structure of a display part which is recited in the claim section.

The controller 110 is configured to include an input controller 111, a display controller 112, an execution part 113 and a communication controller 114. The memory 120 stores a control program 121, an application 122 and the printer driver 123. The control program 121, the printer driver 123 and the application 122 are stored in the memory 120, for example, via the operation input I/F 130. The memory 120 is formed by a nonvolatile memory. For example, the memory 120 is formed by an EEPROM, a flash memory, a resistive random access memory, or the like. The printer driver 123, for example, is read from a recording medium such as a CD-ROM (Compact Disc Read Only Memory) in which the printer driver 123 is stored, and is stored in the memory 120.

The control program 121, the application 122 and the printer driver 123 are loaded into the controller 110. By loading the control program 121 into the controller 110, the controller 110 performs a series of operations described in the control program 121. By loading the application 122 into the controller 110, the controller 110 performs a series of operations described in the application 122. By loading the printer driver 123 into the controller 110, the controller 110 performs a series of operations described in the printer driver 123.

The control program 121 is a program that performs control of the entire information processing apparatus 100. The control program 121 is a program for allowing the controller 110 to function as the input controller 111, the display controller 112, the execution part 113 and the communication controller 114. The input controller 111, the display controller 112, the execution part 113 and the communication controller 114 will be described in detail later. The application 122 is a program that produces data such as a document based on an input received from a user via the operation input I/F 130. The application 122 calls the printer driver 123 with respect to a print request received from a user via the operation input I/F 130.

Figure 2:
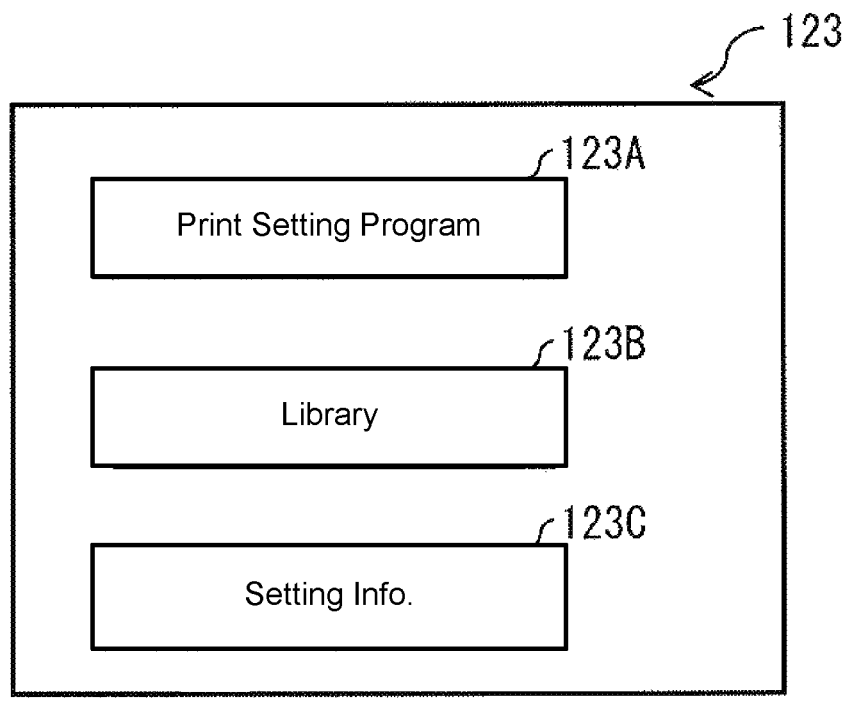
FIG. 2 illustrates an example of a schematic configuration of a printer driver.

FIG. 2 illustrates an example of a schematic configuration of the printer driver 123. The printer driver 123 is configured to include a print setting program 123A, a library 123B and setting information 123C. The print setting program 123A is a program that controls behavior of printing. The library 123B and the setting information 123C are data used during execution of the print setting program 123A. The library 123B has a variety of data required to generate the printer driver UI screen 400 (to be described later). The library 123B, for example, as illustrated in FIG. 3, is configured to include a plurality of tab informations 123B-1, a plurality of print setting items 123B-2 and a plurality of images 123B-3. The plurality of the tab informations 123B-1 and the plurality of the print setting items 123B-2 correspond to a specific example of "a plurality of items related to a setting condition" of the present invention. The plurality of the images 123B-3 correspond to a specific example of "a plurality of images" of the present invention.

The tab informations 123B-1 are each one of items related to the setting condition, and, specifically, are index tabs. The index tabs are each a tab assigned with a category related to the setting condition. The plurality of the tab informations 123B-1 include, for example, a category of a tab A, a category of a tab B, and a category of a tab C. The category of the tab A, the category of the tab B and the category of the tab C are each assigned with an item name related to the setting condition. The category of the tab A, for example, is assigned with "apparatus setting." The apparatus setting, for example, is defined as a concept that includes a sheet feeding method. The category of the tab B and the category of the tab C, for example, are assigned with "print setting." The print setting, for example, is defined as a concept that includes a resolution, the number of prints, a layout, a printing method and a binding direction. The plurality of the tab informations 123B-1 are arranged in the library 123B. The arrangement of the plurality of the tab informations 123B-1 corresponds to an arrangement of the index tabs in the printer driver UI screen 400. When the arrangement of the plurality of the tab informations 123B-1 is such that, for example, the category of the tab A, the category of the tab B and the category of the tab C are arranged in this order from a left side, in the printer driver UI screen 400, the tab A, the tab B and the tab C are arranged in this order from a left side. The tabs A, B, and C are example of first to third setting tabs of the invention.

The print setting items 123B-2 are each one of the items related to the setting condition, and, specifically, are print setting items. The plurality of the print setting items 123B-2 include, for example, a sheet feeding method, a resolution, the number of prints, a layout, a printing method and a binding direction. One or multiple of the plurality of the print setting items 123B-2 are associated with each of the tab informations 123B-1. The sheet feeding method, for example, is associated with the tab A. The resolution and the number of prints, for example, are associated with the tab B. The layout, the printing method and the binding direction, for example, are associated with the tab C. Here, the sheet feeding method, for example, includes a setting condition such as a tray 1 or a tray 2. The resolution, for example, includes a setting condition such as "normal" or "excellent." The number of prints, for example, includes a setting condition such as 1, 2, . . . , or n (where n is a positive integer of 3 or larger). The layout, for example, includes a setting condition such as normal printing or 2-UP. The printing method, for example, includes a setting condition such as single sided printing or double sided printing. The binding direction, for example, includes a setting condition such as a transverse direction or a longitudinal direction. In the library 123B of FIG. 3, "layout and print setting" is among the print setting items 123B-2. This is because a plurality of images 123B-3 are prepared in the library 123B according to a combination of a condition set by a user in the layout and a condition set in the print setting.

The images 123B-3 are image data sets in formats of jpeg, bitmap and the like. Multiple of the plurality of the images 123B-3 are associated with each of the print setting items 123B-2. The plurality of the images 123B-3 are configured to include a plurality of image data sets, among which multiple image data sets are associated with each of the print setting items 123B-2. The plurality of the images 123B-3 include a plurality of image data sets that have mutually the same image design and mutually different numbers of pixels. A plurality of images 123B-3 that have mutually the same image design and mutually different numbers of pixels are provided for each of the print setting items 123B-2. That is, a plurality of images 123B-3 that have mutually the same image design and mutually different numbers of pixels are provided for each of the tab informations 123B-1.

The plurality of the images 123B-3 are configured to include, as images corresponding to the sheet feeding method, for example, main image data of the tray 1, main image data of the tray 2, sub image data of the tray 1, and sub image data of the tray 2. The main image data of the tray 1 is image data having the same design as the sub image data of the tray 1, and is image data having a larger number of pixels than the sub image data of the tray 1. The main image data of the tray 2 is image data having the same design as the sub image data of the tray 2, and is image data having a larger number of pixels than the sub image data of the tray 2.

The plurality of the images 123B-3 are configured to include, as images corresponding to the resolutions, for example, main image data of the "normal resolution (or Normal Resl.)," main image data of the "excellent resolution (or Excel. Resl.)," sub image data of the "normal resolution," and sub image data of the "excellent resolution." The main image data of the "normal resolution" is image data having the same design as the sub image data of the "normal resolution," and is image data having a larger number of pixels than the sub image data of the "normal resolution." The main image data of the "excellent resolution" is image data having the same design as the sub image data of the "excellent resolution," and is image data having a larger number of pixels than the sub image data of the "excellent resolution."

The plurality of the images 123B-3 are configured to include, as images corresponding to the numbers of prints, for example, main image data of the "one print," main image data of the "two prints," sub image data of the "one print," and sub image data of the "two prints." The main image data of the "one print" is image data having the same design as the sub image data of the "one print," and is image data having a larger number of pixels than the sub image data of the "one print." The main image data of the "two prints" is image data having the same design as the sub image data of the "two prints," and is image data having a larger number of pixels than the sub image data of the "two prints."

The plurality of the images 123B-3 are configured to include, as images corresponding to the layouts, for example, main image data of the "normal printing," main image data of the "2-UP," sub image data of the "normal printing," and sub image data of the "2-UP." The main image data of the "normal printing" is image data having the same design as the sub image data of the "normal printing," and is image data having a larger number of pixels than the sub image data of the "normal printing." The main image data of the "2-UP" is image data having the same design as the sub image data of the "2-UP," and is image data having a larger number of pixels than the sub image data of the "2-UP."

The plurality of the images 123B-3 are configured to include, as images corresponding to the printing methods, for example, main image data of the "single sided printing," main image data of the "double sided printing," sub image data of the "single sided printing," and sub image data of the "double sided printing." The main image data of the "single sided printing" is image data having the same design as the sub image data of the "single sided printing," and is image data having a larger number of pixels than the sub image data of the "single sided printing." The main image data of the "double sided printing" is image data having the same design as the sub image data of the "double sided printing," and is image data having a larger number of pixels than the sub image data of the "double sided printing."

The plurality of the images 123B-3 are configured to include, as images corresponding to the binding directions, for example, main image data of the "transverse direction," main image data of the "longitudinal direction," sub image data of the "transverse direction," and sub image data of the "longitudinal direction." The main image data of the "transverse direction" is image data having the same design as the sub image data of the "transverse direction," and is image data having a larger number of pixels than the sub image data of the "transverse direction." The main image data of the "longitudinal direction" is image data having the same design as the sub image data of the "longitudinal direction," and is image data having a larger number of pixels than the sub image data of the "longitudinal direction." In FIG. 3, double-sided is shown as D-Side, single-sided is shown as S-Side. The transverse direction as T-direction, the longitudinal direction as L-direction.

Figure 4:
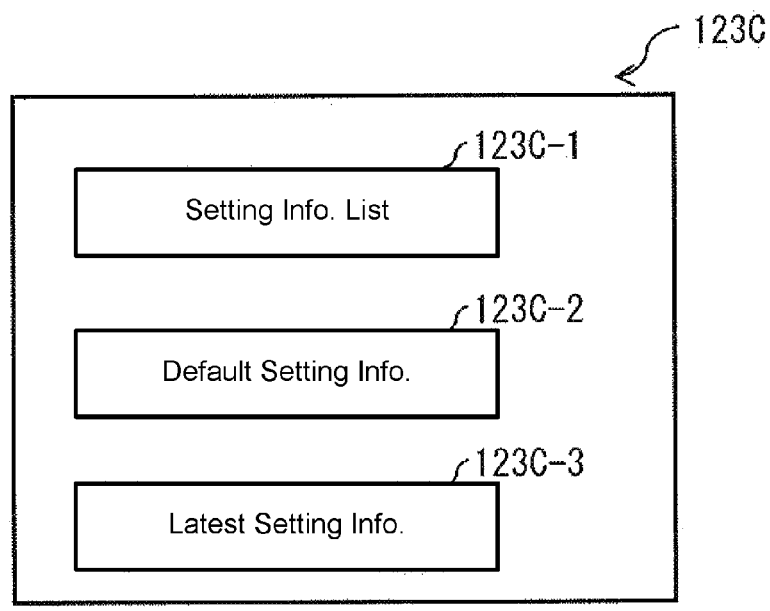
FIG. 4 illustrates an example of setting information.

FIG. 4 illustrates an example of a schematic configuration of the setting information 123C. The setting information 123C includes, for example, a setting information list 123C-1, default setting information 123C-2, and latest setting information 123C-3. The setting information list 123C-1 is a list (selection list) for a user to select a setting condition, and includes lists that are respectively set for the print setting items 123B-2. The setting information list 123C-1 includes, for example, a selection list of the sheet feeding methods, a selection list of the resolutions, a selection list of the numbers of prints, a selection list of the layouts, a selection list of the printing methods, and a selection list of the binding directions.

Here, the selection list of the sheet feeding methods includes, for example, the setting conditions such as the "tray 1," the "tray 2" and the like. The selection list of the resolutions includes, for example, the setting conditions such as the "normal," the "excellent" and the like. The selection list of the numbers of prints includes, for example, setting conditions such as 1, 2, . . . , n (where n is a positive integer of 3 or larger) and the like. The selection list of the layouts includes, for example, the setting conditions such as the "normal printing," the "2-UP" and the like. The selection list of the printing methods includes, for example, the setting conditions such as the "single sided printing (or S-Side Print)," the "double sided printing (or D-Side Print)" and the like. The selection list of the binding directions includes, for example, the setting conditions such as the "transverse direction," the "longitudinal direction" and the like.

The default setting information 123C-2 is initial setting information, and is setting information that has not been overwritten. The default setting information 123C-2 is configured to include, for example, the "tray 1" as the sheet feeding method, the "excellent" as the resolution, "1" as the number of prints, the "normal printing" as the layout, the "single sided printing" as the printing method, and the "transverse direction" as the binding direction. The default setting information 123C-2 is configured to include, as a default tab information 123A-1, for example, an identifier of a tab A410 (to be described later) (for example, a name of "tab A"). The "default tab information 123A-1" refers to a tab information that is initially opened when a dialog screen (the printer driver UI screen 400), which is a UI of the printer driver 123, is displayed.

Further, the default setting information 123C-2 is configured to include a default print setting item 123B-2 for each tab. The "default print setting item 123B-2 of a tab" refers to a print setting item 123B-2 that is related to an image displayed in a main window 400a in an opened tab, when the printer driver UI screen 400 is displayed and when the tab, which is selected by a user, is opened. The default setting information 123C-2 is configured to include, for example, as a default print setting item 123B-2 of the tab A410, for example, the "sheet feeding method." The default setting information 123C-2 is configured to include, for example, as a default print setting item 123B-2 of a tab B420, for example, the "resolution." The default setting information 123C-2 is configured to include, for example, as a default print setting item 123B-2 of a tab C430, for example, the "layout." The latest setting information 123C-3 is setting information that is overwritten at any time, and usually includes setting information of a setting condition different from the default setting information 123C-2.

Figure 5:
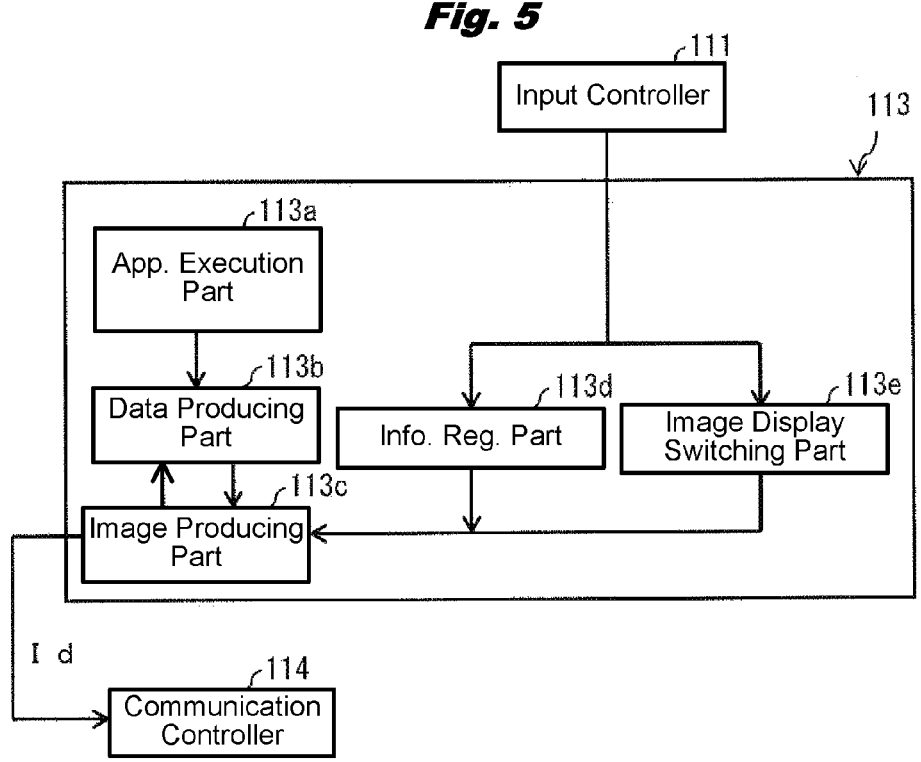
FIG. 5 illustrates an example of functional blocks of an execution part of FIG. 1.

FIG. 5 illustrates an example of functional blocks of the execution part 113 in the controller 110. The execution part 113 includes, for example, an application execution part 113a, a data producing part 113b, an image producing part 113c, an information registering part 113d, and an image display switching part 113e. The display switching part 113e is a correspondence structure of a display switching part which is recited in the claimed section. The application execution part 113a executes the application 122, and produces data such as a document on the application 122. The application execution part 113a generates drawing data from the produced data according to a print execution request received from a user via the operation input I/F 130, and, after converting the generated drawing data to a drawing format that depends on the printer driver 123, outputs the drawing data after the conversion to the data producing part 113b. The data producing part 113b converts the drawing data input from the application execution part 113a to print data that can be processed by the image forming apparatus 200, and outputs the print data to the communication controller 114. The communication controller 114 outputs the print data via the network I/F 150 and the network 300 to the image forming apparatus 200.

The image producing part 113c produces the display screen data Id that includes the dialog screen (the printer driver UI screen 400), which is a UI of the printer driver 123, according to a print request received from a user via the operation input I/F 130. The image producing part 113c generates the display screen data Id that includes a plurality of items (specifically, at least one of the tab informations 123B-1 and the print setting items 123B-2), which are related to the setting condition, and an image 123B-3 that corresponds to a specific item that is one of the plurality of the items. The specific item refers to an item related to the image 123B-3 displayed in the dialog screen (the printer driver UI screen 400), which is the UI of the printer driver 123. The image producing part 113c outputs the generated display screen data Id to the communication controller 114. In general, the specific item may be determined by user's choice or by the displayed image.

The communication controller 114 outputs the display screen data Id to the display output I/F 140. The display output I/F 140 displays a screen based on the display screen data Id. When a display image that includes the printer driver UI screen 400 is displayed in the display output I/F 140, when a selection item that is an item other than the specific item is selected from the plurality of the items included in the printer driver UI screen 400 by an operation of the operation input I/F 130 by a user, the information registering part 113d obtains the selected selection item from the input controller 111 and stores the selected selection item in the latest setting information 123C-3 in the memory 120. The selection item is an item that is selected (modified) by the user. The information registering part 113d further outputs the selected selection item to the image producing part 113c. When an image 123B-3 corresponding to the selection item obtained from the input controller 111 is stored in the library 123B in the memory 120, the image display switching part 113e reads out the image 123B-3 from the library 123B. The image display switching part 113e outputs the image 123B-3 read out from the library 123B to the image producing part 113c.

The image producing part 113c generates the display screen data Id that includes the image 123B-3 input from the image display switching part 113e in place of the image 123B-3 in the display screen data Id displayed in the display output I/F 140, at a display position of the image 123B-3 in the display screen data Id displayed in the display output I/F 140. The image producing part 113c outputs the generated display screen data Id to the communication controller 114.

When a selection item and an image 123B-3 corresponding to the selection item are input from the information registering part 113d and the image display switching part 113e, the image producing part 113c reproduce the display screen data Id including the printer driver UI screen 400. The image producing part 113c generates the display screen data Id that includes a plurality of items (specifically, at least one of the tab informations 123B-1 and the print setting items 123B-2), which are related to the setting condition, and an image 123B-3 that corresponds to a selection item that is one of the plurality of the items. That is, the image producing part 113c generates the display screen data Id that includes the image 123B-3 corresponding to the selection item in place of the image 123B-3 corresponding to the specific item at the display position of the image 123B-3 corresponding to the specific item in the display screen data Id that was produced earlier. The image producing part 113c outputs the generated display screen data Id to the communication controller 114. The communication controller 114 outputs the display screen data Id to the display output I/F 140. The display output I/F 140 displays a screen based on the display screen data Id.

Here, the specific item and the selection item may each be a tab information 123B-1 (that is, an index tab). In this case, the image 123B-3 corresponding to the specific item (tab information 123B-1) is an image 123B-3 related to a print setting item 123B-2 corresponding to the specific item (tab information 123B-1). The image 123B-3 corresponding to the selection item (tab information 123B-1) is an image 123B-3 related to a print setting item 123B-2 corresponding to the selection item (tab information 123B-1).

Here, the specific item and the selection item may each be a print setting item 123B-2. In this case, the image 123B-3 corresponding to the specific item (print setting item 123B-2) is an image 123B-3 related to the specific item (print setting item 123B-2). The image 123B-3 corresponding to the selection item (print setting item 123B-2) is an image 123B-3 related to the selection item (print setting item 123B-2).

However, it is also possible that the image producing part 113c generates the display screen data Id that includes a plurality of items (specifically, at least one of the tab informations 123B-1 and the print setting items 123B-2), which are related to the setting condition, and an image 123B-3 that corresponds to the specific item that is one of the plurality of the items, and an image 123B-3 that corresponds to an item that will become the selection item later. In this case, the image producing part 113c generates the display screen data Id that includes the specific item, the selection item, the image 123B-3 corresponding to the specific item, and the image 123B-3 corresponding to the item that later becomes the selection item. In this case, it is also possible that the image producing part 113c generates the display screen data Id that includes the image 123B-3 corresponding to the specific item as a main image and the image 123B-3 corresponding to the item that later becomes the selection item as a sub image. In this case, the image producing part 113c obtains from the library 123B in the memory 120, as the image 123B-3 corresponding to the specific item, an image having a number of pixels larger than the image 123B-3 corresponding to the item that later becomes the selection item. Further, the image producing part 113c obtains from the library 123B in the memory 120, as the image 123B-3 corresponding to the item that later becomes the selection item, an image having a number of pixels smaller than the image 123B-3 corresponding to the specific item.

In this case, further, when the selection item and the image 123B-3 corresponding to the selection item are input from the information registering part 113d and the image display switching part 113e, the image producing part 113c generates the display screen data Id that includes the image 123B-3 corresponding to the selection item as a main image and the image 123B-3 corresponding to the specific item as a sub image. That is, it is also possible that the image producing part 113c generates the display screen data Id in which the image 123B-3 corresponding to the selection item is arranged at the display position of the image 123B-3 corresponding to the specific item in the display screen data Id that was produced earlier, and the image 123B-3 corresponding to the specific item is arranged at the display position of the image 123B-3 corresponding to the selection item in the display screen data Id that was produced earlier. In this case, it is also possible that the image producing part 113c obtains from the library 123B in the memory 120, as the image 123B-3 corresponding to the specific item, an image having a number of pixels smaller than the image 123B-3 corresponding to the selection item. It is also possible that the image producing part 113c obtains from the library 123B in the memory 120, as the image 123B-3 corresponding to the selection item, an image having a number of pixels larger than the image 123B-3 corresponding to the specific item.

Figure 6:
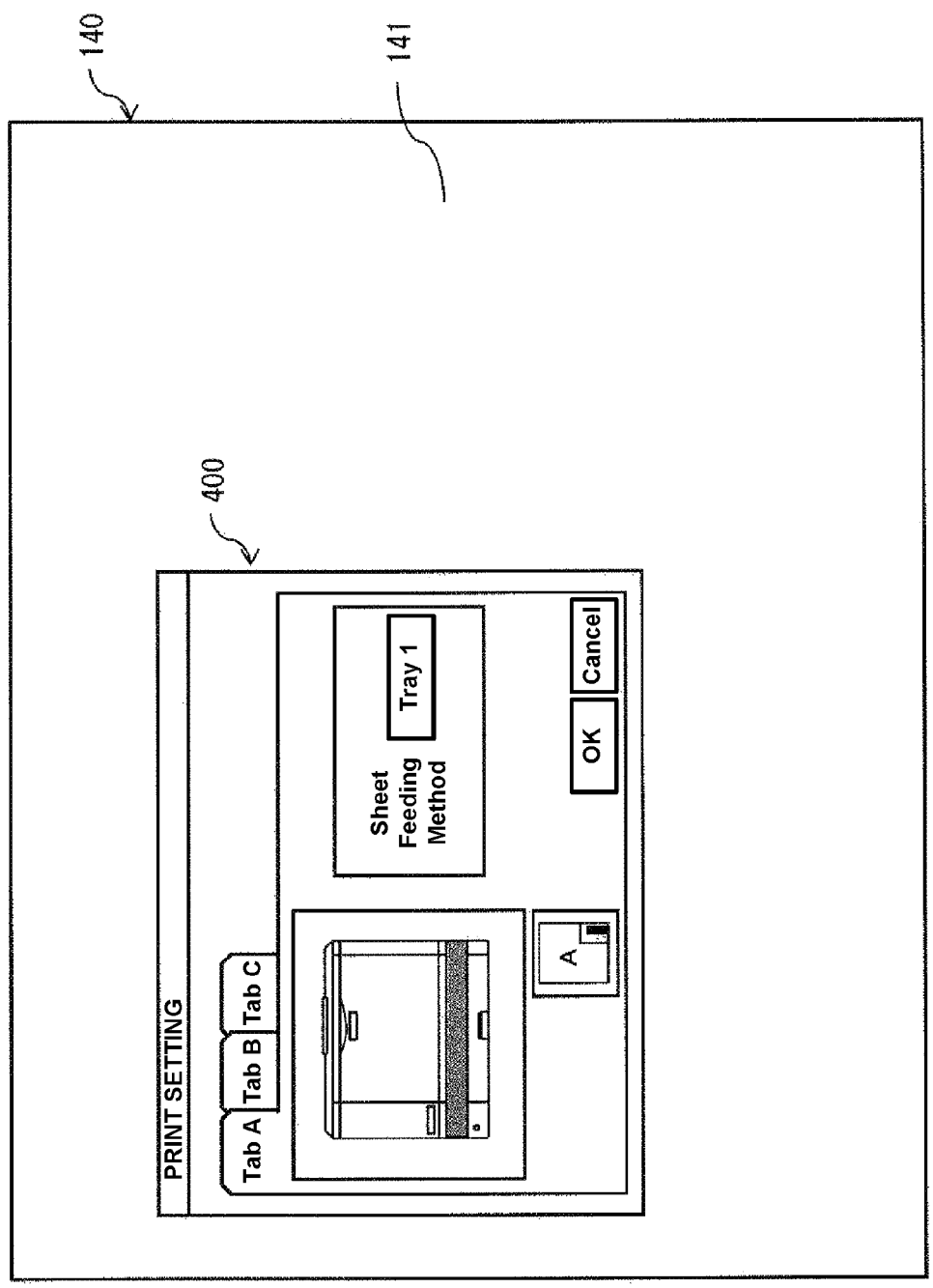
FIG. 6 illustrates an example of a screen of a display output I/F.
Figure 7:
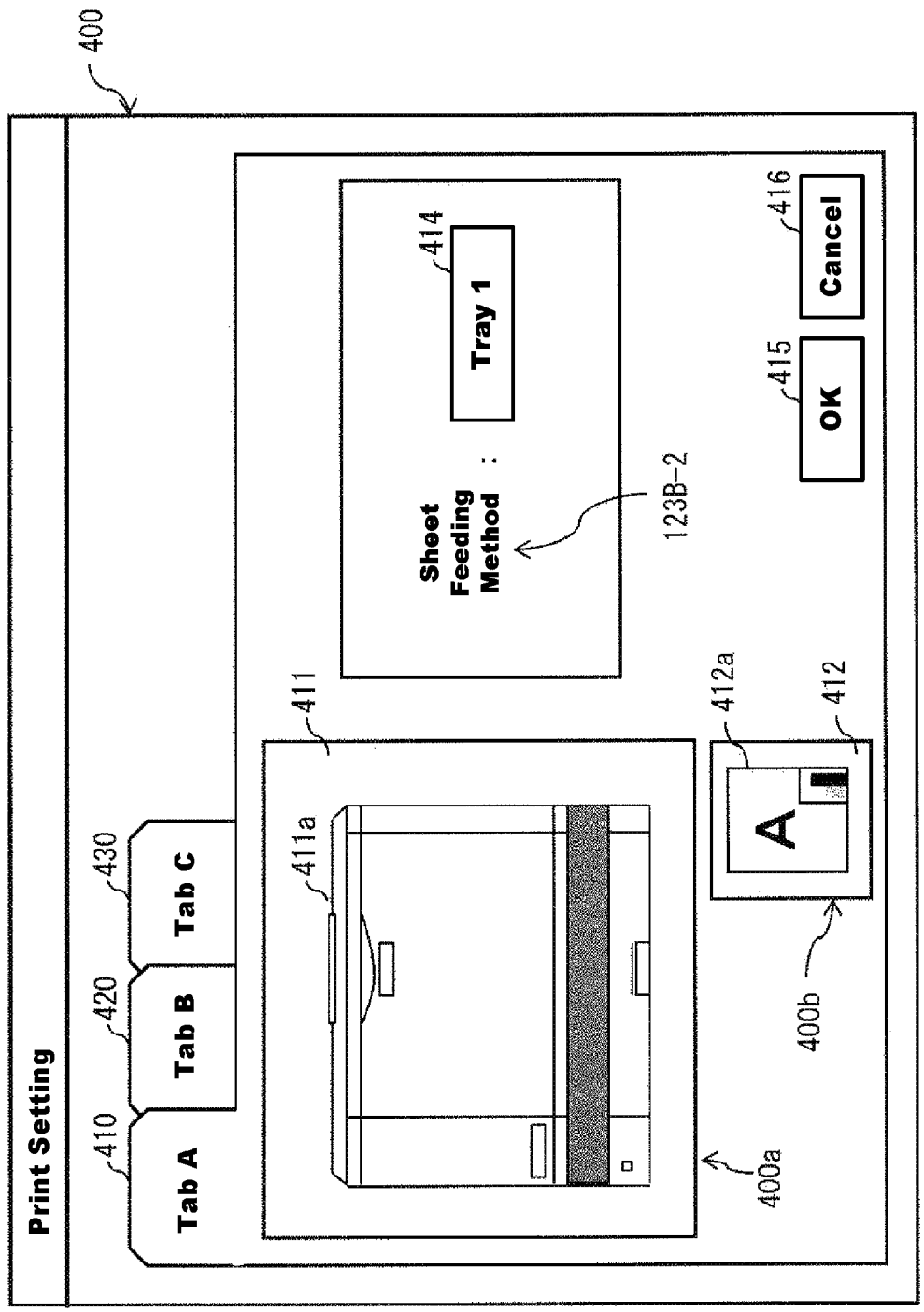
FIG. 7 illustrates an example of a printer driver UI screen.

FIG. 6 illustrates an example of an image in the display output I/F 140. The image in the display output I/F 140 is an image formed by superimposing the printer driver UI screen 400 and a background screen 141 with each other such that the printer driver UI screen 400 becomes an outermost screen. FIG. 7 illustrates an enlarged view of only the printer driver UI screen 400 in FIG. 6. FIGS. 6 and 7 illustrate a state when the display screen data Id is input from the controller 110 to the display output I/F 140 and the image is displayed in the display output I/F 140.

In the printer driver UI screen 400, three tabs (the tab A410, the tab B420 and the tab C430) are arranged, and the tab A410 on the leftmost side is opened by default. That is, in the default setting information 123C-2, the identifier of the tab A410 as a default tab is described. Further, in the setting information 123C, one print setting item 123B-2 (the sheet feeding method) is associated with the tab A410. Therefore, the one print setting item 123B-2 (the sheet feeding method) associated with the tab A410 is displayed, and, adjacent to the display position, the default setting condition (the tray 1) is displayed. The place where the default setting condition is displayed is selected using the operation input I/F 130 (for example, a mouse). Thereby, a selection list of the one print setting item 123B-2 associated with the tab A410 (a selection list 414 of the sheet feeding method) is displayed.

Further, the main window 400a and a sub window 400b that has an area smaller than the main window 400a are provided in the tab A410. An image 411 that includes a main image 411a is displayed in the main window 400a. In this case, the main image 411a is an image corresponding to the default print setting item 123B-2 of the tab A410 (an image related to the sheet feeding method), and specifically, is a tray 1 main image 123B-3. On the other hand, an image 412 that includes a sub image 412a is displayed in the sub window 400b. In this case, the sub image 412a is an image (for example, a normal printing sub image 123B-3) corresponding to the default print setting item 123B-2 of a tab (for example, the tab B420 or the tab C430) of a category different from the category of the tab A410. Therefore, in the tab A410, when the tab A410 is displayed, the main image 411a (the tray 1 main image 123B-3) corresponding to the default print setting item 123B-2 of the tab A410 is displayed in the main window 400a, and the sub image 412a (for example, the normal printing sub image 123B-3) corresponding to the default print setting item 123B-2 of a tab of a category different from the category of the tab A410 is displayed in the sub window 400b.

The image producing part 113c generates the display screen data Id that includes the following (a1)-(a4). Specifically, the image producing part 113c generates the display screen data Id that includes (a3) at the position of the main window 400a, (a4) at the position of the sub window 400b, and (a1) and (a2) at positions adjacent to the main window 400a. As a result, the printer driver UI screen 400 as illustrated in FIG. 7 can be generated.

(a1) The three tab informations 123B-1 that correspond to the three tabs (the tab A410, the tab B420 and the tab C430).

(a2) One print setting item 123B-2 (the sheet feeding method) associated with the tab A410 and the default setting condition (the tray 1) of the one print setting item 123B-2.

(a3) The main image 411a (the tray 1 main image 123B-3) corresponding to the setting condition (the tray 1) of the default print setting items 123B-2 of the tab A410.

(a4) The sub image 412a (for example, the normal printing sub image 123B-3) corresponding to the default print setting item 123B-2 of a tab of a category different from the category of the tab A410.

In this case, the default print setting item 123B-2 (the sheet feeding method) of the tab A410 corresponds to a specific example of a "specific item" of the present invention. Further, (a3) corresponds to a specific example of a "first image" of the present invention. Further, the display screen data Id that includes the above-described (a1)-(a4) corresponds to a specific example of "first display screen data" of the present invention.

FIG. 7 is further explained. When the user clicks the sub window, the controller switches the image of the main window with the image of the sub window. In the drawing, by clicking, image 412a of the print setting category, which was displayed in the sub window, is now displayed in the main window. On the other hand, image 411a of the apparatus setting category, which was displayed in the main window, is now displayed in the sub window. Under such a condition where the images are switched, when the user selects tray 2 from the selection list, the controller determines that the category of tray 2, which was selected, belongs to the apparatus setting category, and switches the image of the main window from the image of the print setting to the image of the apparatus setting.

In the embodiment, image 412a on the main window, which was switched from the sub window, is the first display screen in the first generation part and the print setting category is a specific item. Image 411a on the sub window, which was switched from the main window, is the second display screen in the second generation part and tray 2 (sheet feeding method), which was selected by the user, is a selection item.

For the specific items and the selection items of the invention, categories of the index tabs and the print setting items are available. Like the embodiments discussed above, they are not necessarily at the same level. One may be an index tab and the other(s) may be a print setting item.

Figure 8:
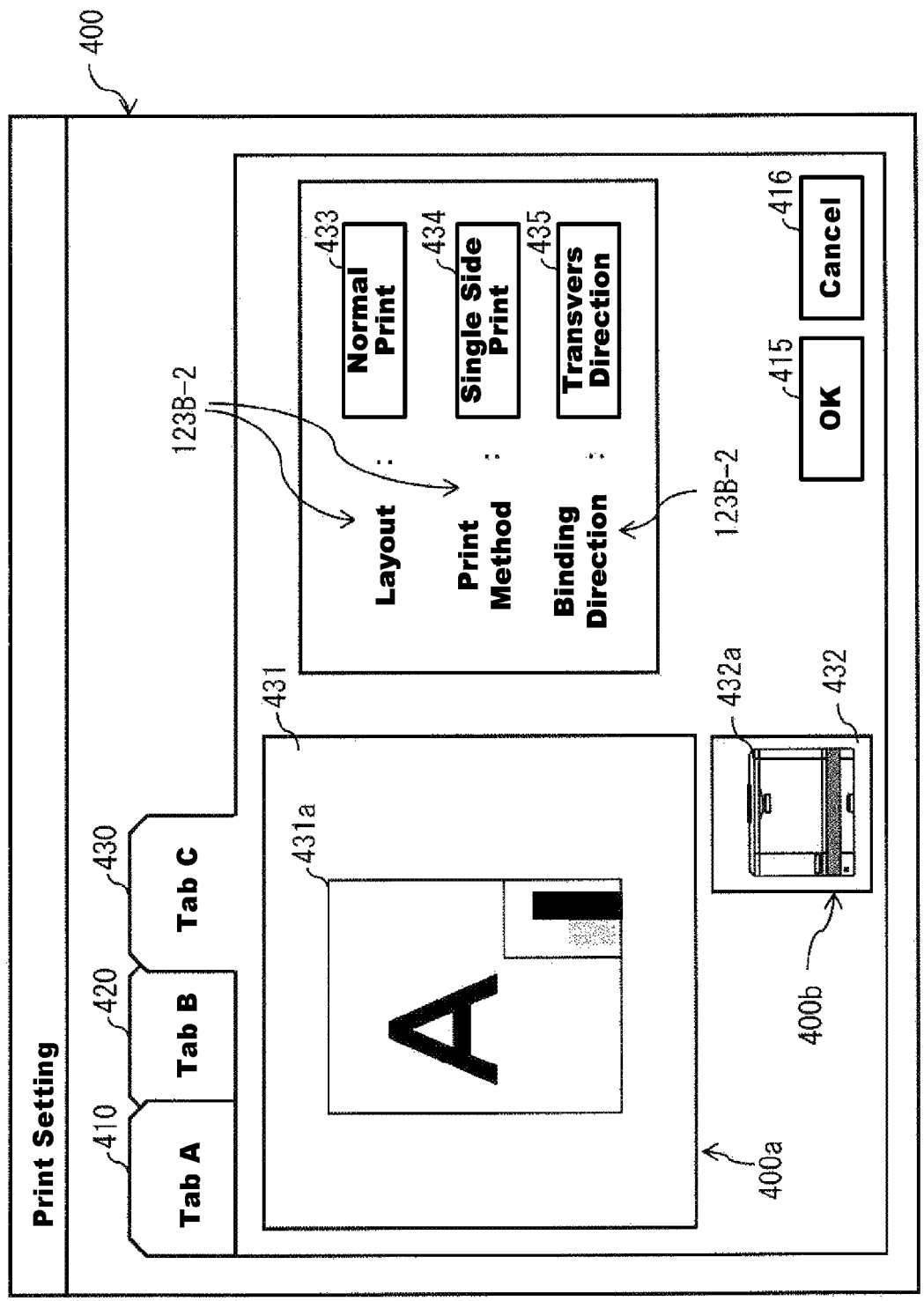
FIG. 8 illustrates an example of a printer driver UI screen.

FIG. 8 illustrates an example of an image in the display output I/F 140. FIG. 8 illustrates a state when the tab C430 is selected and the tab C430 is opened in place of the tab A410 in the printer driver UI screen 400 illustrated in FIG. 7 (in the state in which the tab A410 is opened). That is, FIG. 8 illustrates a state when transition from the tab A410 that is assigned with the category of "apparatus setting" to the tab C430 that is assigned with the category of "print setting" has occurred.

Three print setting items 123B-2 (the layout, the printing method, and the binding direction) are associated with the tab C430. The three print setting items 123B-2 associated with the tab C430 are displayed, and the default setting conditions (the normal printing, the single sided printing, and the transverse direction) are displayed adjacent to the display positions of the three print setting items 123B-2. The places where the default setting conditions are displayed are selected using the operation input I/F 130. Thereby, selection lists of the three print setting items 123B-2 associated with the tab C430 (a selection list 433 of the layout, a selection list 434 of the printing method, and a selection list 445 of the binding direction) are displayed.

Further, the main window 400a and the sub window 400b are provided in the tab C430. An image 431 that includes a main image 431a is displayed in the main window 400a. On the other hand, an image 432 that includes a sub image 432a is displayed in the sub window 400b.

In this case, the category of the opened tab C430 does not match the category of the tab A410 that had been opened until immediately before the opening of the tab C430. Therefore, the image of the main window 400a is switched to the main image 431a (a normal printing main image 123B-3) corresponding to the default print setting item 123B-2 of the tab C430. On the other hand, the image of the sub window 400b is switched to the sub image 432a (a tray 1 sub image 123B-3) that is obtained by reducing the number of pixels of the main image 411a that was displayed in the main window 400*a* of the tab A410 that had been opened until immediately before the opening of the tab C430.

Therefore, in the tab C430, when the display is changed from the tab A410 to the tab C430 of which the category does not match the category of the tab A410, the main image 431*a* (the normal printing main image 123B-3) corresponding to the default print setting item 123B-2 of the tab C430 is displayed in the main window 400*a*, and the sub image 432*a* (the tray 1 sub image 123B-3), which is obtained by reducing the number of pixels of the main image 411*a* that was displayed in the main window 400*a* of the tab A410 that had been opened until immediately before the opening of the tab C430, is displayed in the sub window 400*b*.

When the display is changed from the tab A410 to the tab C430 of which the category does not match the category of the tab A410, the image producing part 113*c* generates the display screen data Id that includes the following (b1)-(b4). That is, when the display is changed from the tab A410 to the tab C430 of which the category does not match the category of the tab A410, the image producing part 113*c* generates the display screen data Id in which the main image 411*a* (the tray 1 main image 123B-3) of the tab A410 that had been opened until immediately before the opening of the tab C430 is switched to the sub image 432*a* (the tray 1 sub image 123B-3) that is obtained by reducing the number of pixels of the main image 411*a*, and the sub image 432*a* is arranged at the position (the sub window 400*b*) where the sub image 412*a* was displayed, and further the main image 431*a* (the normal printing main image 123B-3) corresponding to the default print setting item 123B-2 of the tab C430 is arranged in the main window 400*a*. As a result, the printer driver UI screen 400 as illustrated in FIG. 8 can be generated.

(b1) The three tab informations 123B-1 corresponding to the three tabs (the tab A410, the tab B420 and the tab C430).

(b2) The three print setting items 123B-2 (the layout, the printing method, and the binding direction) associated with the tab C430 and the default setting conditions (the normal printing, the single sided printing, and the transverse direction) of the three print setting items 123B-2.

(b3) The main image 431*a* (the normal printing main image 123B-3) corresponding to the setting condition (the normal printing) of the default print setting item 123B-2 of the tab C430.

(b4) The sub image 432*a* (the tray 1 sub image 123B-3) that is obtained by reducing the number of pixels of the main image 411*a* (the tray 1 main image 123B-3) that was displayed in the main window 400*a* of the tab A410 that had been opened until immediately before the opening of the tab C430.

It is also possible that, when the display is changed from the tab A410 to the tab C430 of which the category does not match the category of the tab A410, the image producing part 113*c* generates the display screen data Id in which the sub image 412*a* (the normal printing sub image 123B-3) of the tab A410 that had been opened until immediately before the opening of the tab C430 is switched to the main image 431*a* (the normal printing main image 123B-3) that has a larger number of pixels than the sub image 412*a*, and the main image 431*a* is arranged at the position (the main window 400*a*) where the main image 411*a* was displayed.

In this case, the default print setting item 123B-2 (the layout) of the tab C430 corresponds to a specific example of a "selection item" of the present invention. Further, (b3) corresponds to a specific example of a "second image" of the present invention. Further, the display screen data Id that includes the above-described (b1)-(b4) corresponds to a specific example of "second display screen data" of the present invention.

Figure 9:
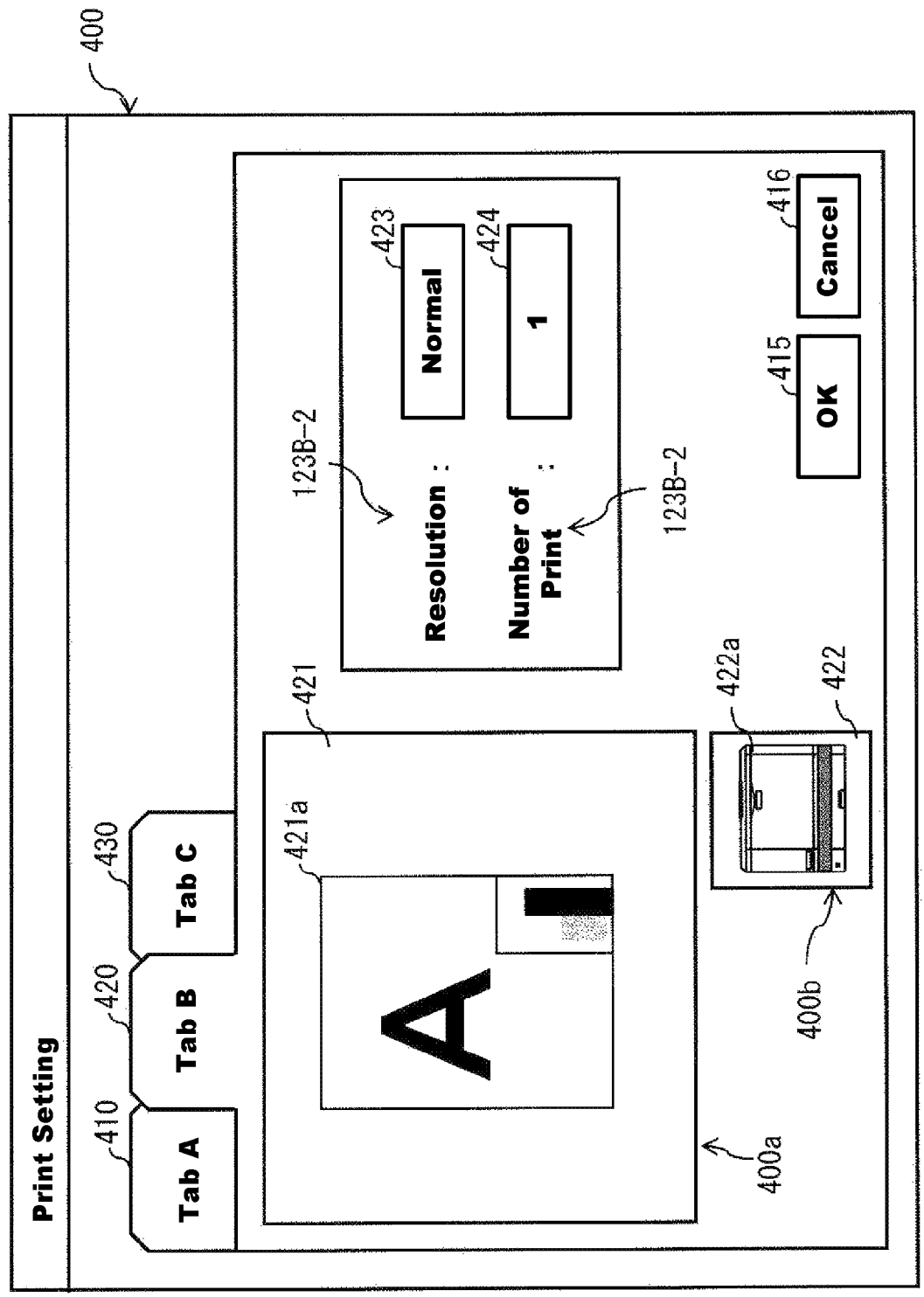
FIG. 9 illustrates an example of a printer driver UI screen.

FIG. 9 illustrates an example of an image in the display output I/F 140. FIG. 9 illustrates a state when the tab B420 is selected and the tab B420 is opened in place of the tab C430 in the printer driver UI screen 400 illustrated in FIG. 8 (in the state in which the tab C430 is opened). That is, FIG. 9 illustrates a state when transition from the tab C430 that is assigned with the category of "print setting" to the tab B420 that is assigned with the category of "print setting," which is the same category as the category of the tab C430, has occurred.

Tow print setting items 123B-2 (the resolution and the number of prints) are associated with the tab B420. The two print setting items 123B-2 associated with the tab B420 are displayed, and the default setting conditions (the normal resolution, and the No. of Print: one) are displayed adjacent to the display positions of the two print setting items 123B-2. The places where the default setting conditions are displayed are selected using the operation input I/F 130 (for example, a mouse). Thereby, selection lists of the two print setting items 123B-2 associated with the tab B420 (a selection list 423 of the resolution, and a selection list 424 of the number of prints) are displayed.

Further, the main window 400*a* and the sub window 400*b* are provided in the tab B420. An image 421 that includes a main image 421*a* is displayed in the main window 400*a*. On the other hand, an image 422 that includes a sub image 422*a* is displayed in the sub window 400*b*.

In this case, the category of opened tab B420 matches the category of the tab C430 that had been opened until immediately before the opening of the tab B420. Therefore, the image of the main window 400*a* is the main image 421*a* that has the same design as the main image 431*a* of the tab C340 that had been opened until immediately before the opening of the tab B420. Specifically, the image of the main window 400*a* is the main image 421*a* (the normal printing main image 123B-3) that is related to the layout. That is, the image corresponding to the default print setting item 123B-2 of the tab B420 is not displayed in the main window 400*a*. On the other hand, the image of the sub window 400*b* is the sub image 422*a* that has the same design as the sub image 432*a* of the tab C340 that had been opened until immediately before the opening of the tab B420. Specifically, the image of the sub window 400*b* is the sub image 422*a* (the tray 1 sub image 123B-3) related to the sheet feeding method.

Therefore, in the tab B420, when the display is changed from the tab C430 to the tab B420 of which the category matches the category of the tab C430, the main image 421*a* (the normal printing main image 123B-3) that has the same design as the main image 431*a* of the tab C340 that had been opened until immediately before the opening of the tab B420 is displayed in the main window 400*a*, and the sub image 422*a* (the tray 1 sub image 123B-3) that has the same design as the sub image 432*a* of the tab C430 that had been opened until immediately before the opening of the tab B420 is displayed in the sub window 400*b*.

When the display is changed from the tab C430 to the tab B420 of which the category matches the category of the tab C430, the image producing part 113*c* generates the display screen data Id that includes the following (c1)-(c4). That is, when the display is changed from the tab C430 to the tab B420 of which the category matches the category of the tab C430, the image producing part 113*c* generates the display screen data Id in which the main image 421*a* (the normal printing main image 123B-3) that has the same design as the main image 431*a* of the tab C340 that had been opened until immediately before the opening of the tab B420 is arranged at the position (the main window 400*a*) where the main image 431*a* was displayed, and the sub image 422*a* (the tray 1 sub image 123B-3) that has the same design as the sub image 432*a* of the tab C430 that had been opened until immediately before the opening of the tab B420 is arranged at the position (the sub window 400*b*) where the sub image 432*a* was displayed. As a result, the printer driver UI screen 400 as illustrated in FIG. 9 can be generated.

(c1) The three tab informations 123B-1 corresponding to the three tabs (the tab A410, the tab B420 and the tab C430).

(c2) The two print setting items 123B-2 (the resolution, and the number of prints) associated with the tab B420 and the default setting conditions (the normal resolution, and the one print) of the two print setting items 123B-2.

(c3) The main image 421*a* (the normal printing main image 123B-3) that has the same design as the main image 431*a* of the tab C340 that had been opened until immediately before the opening of the tab B420.

(c4) The sub image 422*a* (the tray 1 sub image 123B-3) that has the same design as the sub image 432*a* of the tab C340 that had been opened until immediately before the opening of the tab B420.

Figure 10:
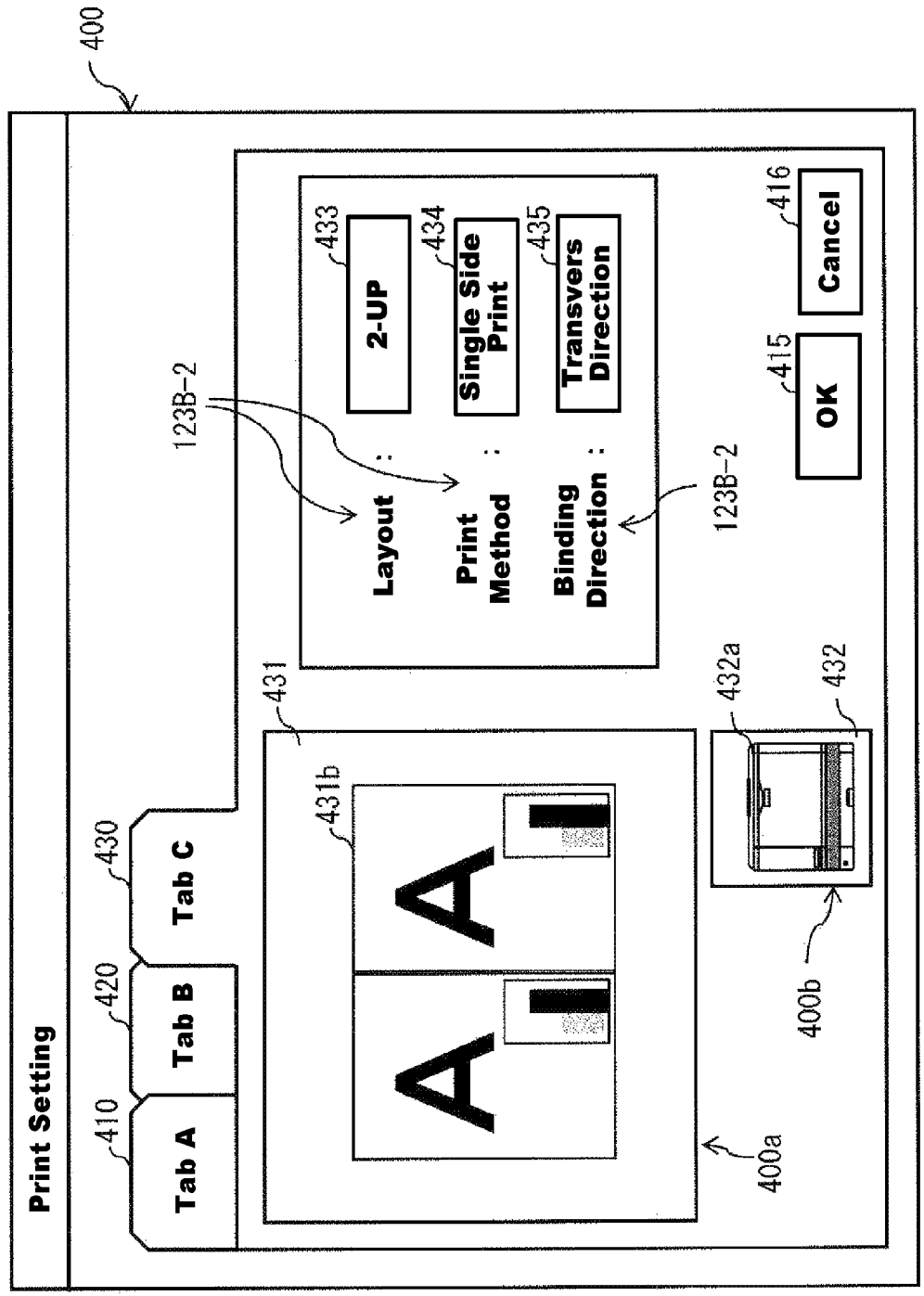
FIG. 10 illustrates an example of a printer driver UI screen.

FIG. 10 illustrates an example of an image in the display output I/F 140. FIG. 10 illustrates a state when the setting condition of the layout is changed from the normal printing to the 2-UP in the selection list 433 in the printer driver UI screen 400 illustrated in FIG. 8 (in the state in which the tab C430 is opened).

By changing the setting condition of the layout from the normal printing to the 2-UP in the selection list 433, the image of the main window 400*a* is switched to a main image 431*b* corresponding to the setting condition after the change. Specifically, the image of the main window 400*a* is switched to a 2-UP main image 123B-3. On the other hand, the image of the sub window 400*b* remains to be the sub image 432*a* before the setting condition of the layout was changed. Specifically, the image of the sub window 400*b* remains to be the tray 1 sub image 123B-3.

Therefore, in the tab C430, when the setting condition of the layout is changed from the normal printing to the 2-UP in the selection list 433, the main image 431*b* (the 2-UP main image 123B-3) corresponding to the setting condition after the change is displayed in the main window 400*a*, and the sub image 432*a* (the tray 1 sub image 123B-3) before the setting condition of the layout was changed remains to be displayed in the sub window 400*b*.

When the setting condition of the layout is changed from the normal printing to the 2-UP in the selection list 433, the image producing part 113*c* generates the display screen data Id that includes the following (d1)-(d4). That is, when the setting condition of the layout is changed from the normal printing to the 2-UP in the selection list 433, the image producing part 113*c* generates the display screen data Id in which the main image 431*a* (the normal printing main image 123B-3) of the tab C430 that had been displayed until immediately before the change is switched to the main image 431*b* (the 2-UP main image 123B-3) that corresponds to the setting condition after the change. As a result, the printer driver UI screen 400 as illustrated in FIG. 10 can be generated.

(d1) The three tab informations 123B-1 corresponding to the three tabs (the tab A410, the tab B420 and the tab C430).

(d2) The three print setting items 123B-2 (the layout, the printing method, and the binding direction) associated with the tab C430 and the setting conditions (the 2-UP, the single sided printing, and the transverse direction) of the three print setting items 123B-2.

(d3) The main image 431*b* (the 2-UP main image 123B-3) corresponding to the setting condition after the change.

(d4) The sub image 432*a* (the tray 1 sub image 123B-3) before the setting condition of the layout is changed.

Figure 11:
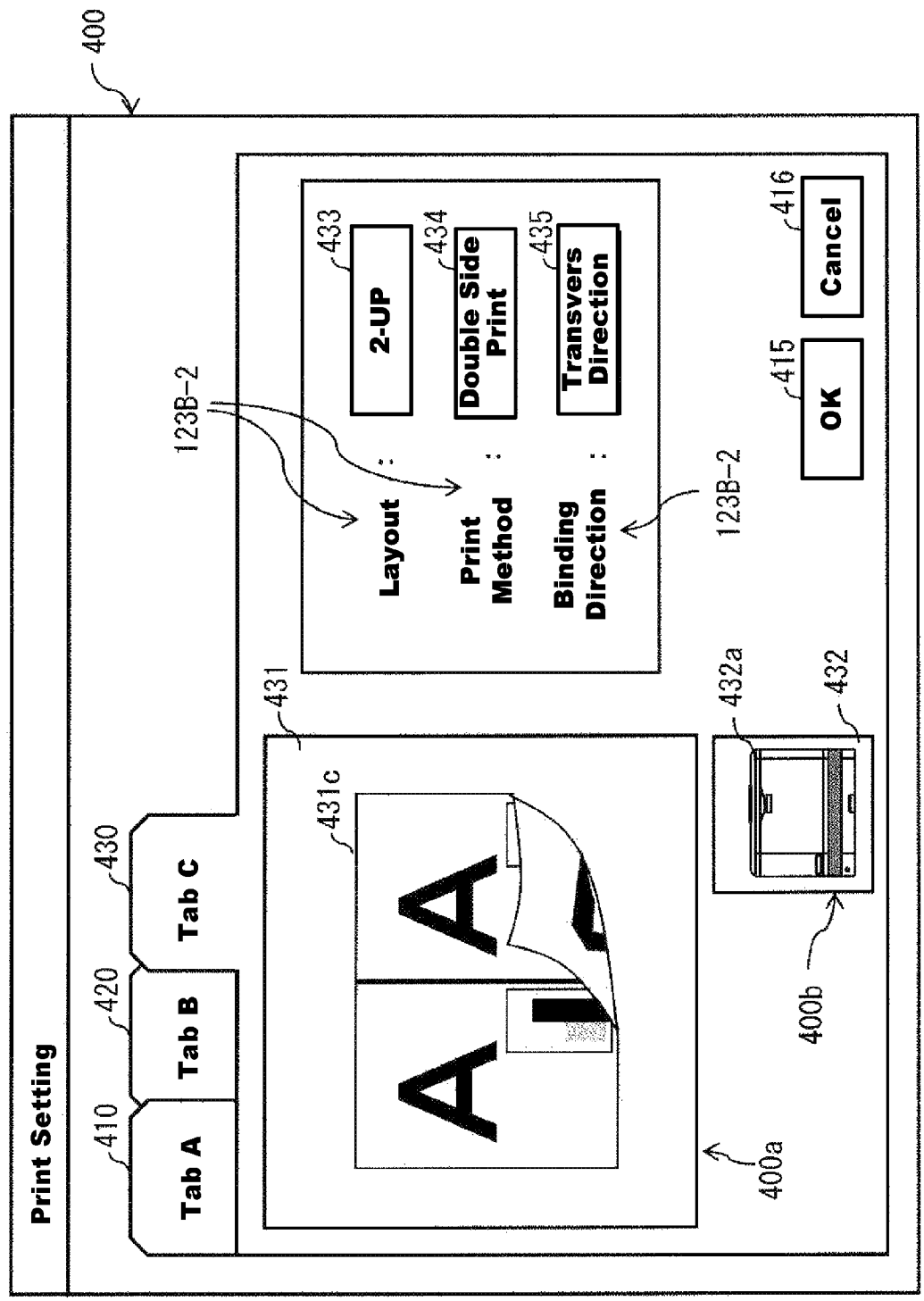
FIG. 11 illustrates an example of a printer driver UI screen.

FIG. 11 illustrates an example of an image in the display output I/F 140. FIG. 11 illustrates a state when the setting condition of the printing method is changed from the single sided printing to the double sided printing in the selection list 434 in the printer driver UI screen 400 illustrated in FIG. 10 (in the state in which the tab C430 is opened).

By changing the setting condition of the print method from the single sided printing to the double sided printing in the selection list 434, the image of the main window 400*a* is switched to a main image 431*c* corresponding to the setting condition after the change. Specifically, the image of the main window 400*a* is switched to a 2-UP double-side main image 123B-3. On the other hand, the image of the sub window 400*b* remains to be the sub image 432*a* before the setting condition of the layout was changed. Specifically, the image of the sub window 400*b* remains to be the tray 1 sub image 123B-3.

Therefore, in the tab C430, after the setting condition of the layout is changed from the normal printing to the 2-UP in the selection list 433, when the setting condition of the printing method is changed from the single sided printing to the double sided printing in the selection list 434, the main image 431*c* (the 2-UP double-side main image 123B-3) corresponding to the two setting conditions that are changed is displayed in the main window 400*a*, and the sub image 432*a* (the tray 1 sub image 123B-3) before the setting condition of the layout is changed remains to be displayed in the sub window 400*b*.

After the setting condition of the layout is changed from the normal printing to the 2-UP in the selection list 433, when the setting condition of the printing method is changed from the single sided printing to the double sided printing in the selection list 434, the image producing part 113*c* generates the display screen data Id that includes the following (e1)-(e4). That is, after the setting condition of the layout is changed from the normal printing to the 2-UP in the selection list 433, when the setting condition of the printing method is changed from the single sided printing to the double sided printing in the selection list 434, the image producing part 113*c* generates the display screen data Id in which the main image 431*b* (the normal image main image 123B-3) that corresponds to the setting condition before the setting condition has been changed for the second time is switched to the main image 431*c* (the 2-UP double-side main image 123B-3) that corresponds to the setting condition after the setting condition has been changed for the first time and the setting condition after the setting condition has been changed for the second time. As a result, the printer driver UI screen 400 as illustrated in FIG. 11 can be generated.

(e1) The three tab informations 123B-1 corresponding to the three tabs (the tab A410, the tab B420 and the tab C430).

(e2) The three print setting items 123B-2 (the layout, the printing method, and the binding direction) associated with the tab C430 and the setting conditions (the 2-UP, the double sided printing, and the transverse direction) of the three print setting items 123B-2.

(e3) The main image 431*c* (the 2-UP double-side main image 123B-3) that corresponds to the setting condition after the setting condition has been changed for the first time and the setting condition after the setting condition has been changed for the second time.
(e4) The sub image 432a (the tray 1 sub image 123B-3) before the setting condition of the layout is changed.

Figure 12:
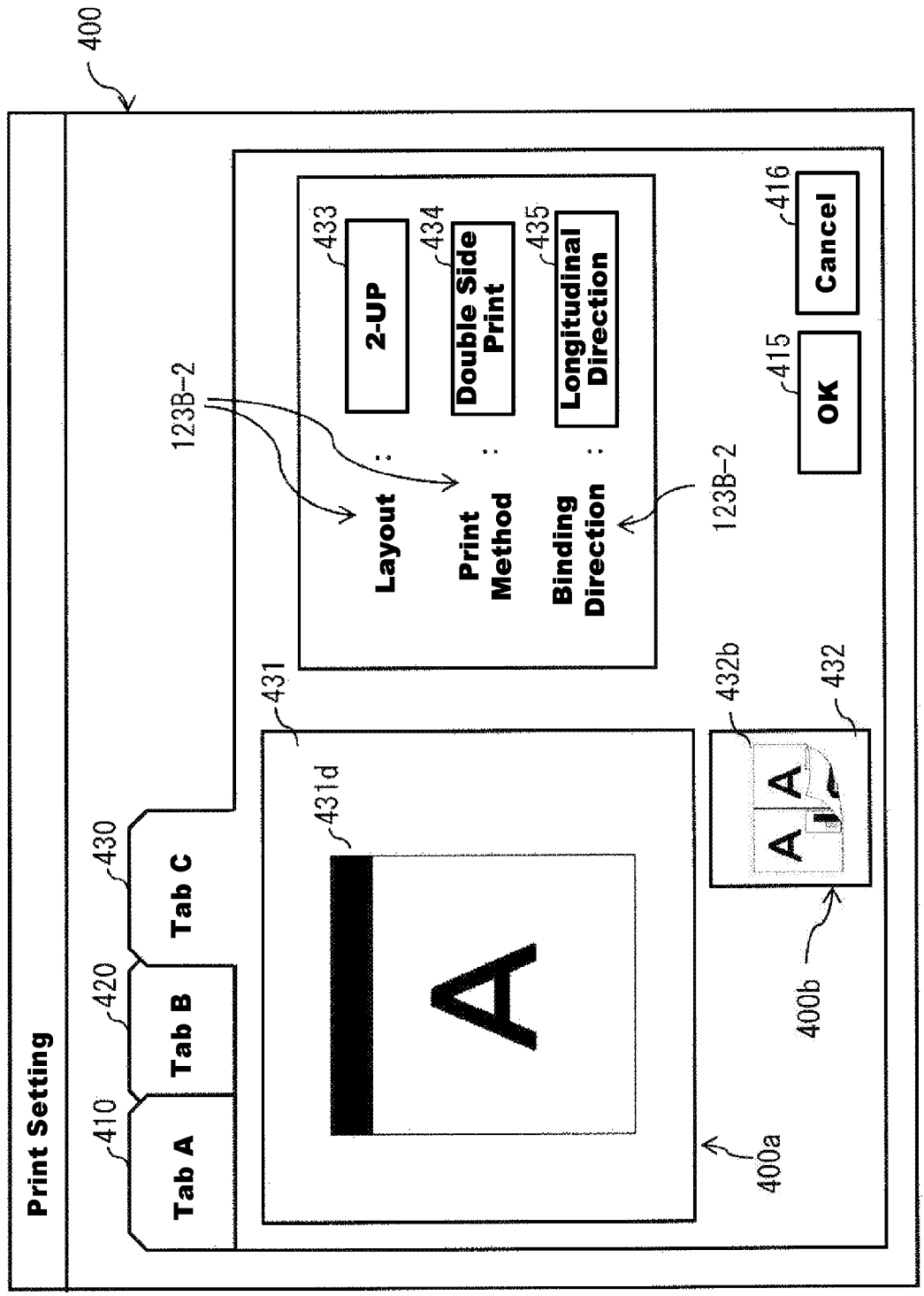
FIG. 12 illustrates an example of a printer driver UI screen.

FIG. 12 illustrates an example of an image in the display output I/F 140. FIG. 12 illustrates a state when the setting condition of the binding direction is changed from the transverse direction to the longitudinal direction in the selection list 435 in the printer driver UI screen 400 illustrated in FIG. 11 (in the state in which the tab C430 is opened).

By changing the setting condition of the binding direction from the transverse direction to the longitudinal direction in the selection list 435, the image of the main window 400a is switched to a main image 431d that corresponds to the setting condition after the change. Specifically, the image of the main window 400a is switched to a longitudinal direction main image 123B-3. On the other hand, the image of the sub window 400b is switched to a sub image 432b (a 2-UP double-side sub image 123B-3) that is obtained by reducing the number of pixels of the main image 431c (the 2-UP double-side main image 123B-3) before the setting condition of the binding direction is changed.

Therefore, in the tab C430, when a setting condition of a print setting item 123B-2 that is different from the print setting item 123B-2 of the main image 431c is changed, the main image 431d (the longitudinal direction main image 123B-3) that corresponds to the setting condition after the change is displayed in the main window 400a, and the sub image 432b (the 2-UP double-side sub image 123B-3) that is obtained by reducing the number of pixels of the main image 431c (the 2-UP double-side main image 123B-3) before the setting condition of the binding direction is changed is displayed in the sub window 400b.

When a setting condition of a print setting item 123B-2 that is different from the print setting item 123B-2 of the main image 431c is changed, the image producing part 113c generate the display screen data Id that includes the following (f1)-(f4). That is, when the setting condition of the print setting item 123B-2 that is different from the print setting item 123B-2 of the main image 431c is changed, the image producing part 113c generates the display screen data Id in which the main image 431c (the 2-UP double-side main image 123B-3) before the setting condition of the binding direction is changed is switched to the sub image 432b (the 2-UP double-side sub image 123B-3) that is obtained by reducing the number of pixels of the main image 431c, and the sub image 432b is arranged at the position (the sub window 400b) where the sub image 432a was displayed, and further, the main image 431d (the longitudinal direction main image 123B-3) that corresponds to the setting condition after the change is arranged at the position (the main window 400a) where the main image 431c was displayed. As a result, the printer driver UI screen 400 as illustrated in FIG. 12 can be generated.
(f1) The three tab informations 123B-1 that correspond to the three tabs (the tab A410, the tab B420 and the tab C430).
(f2) The three print setting items 123B-2 (the layout, the printing method, and the binding direction) that are associated with the tab C430 and the setting conditions (the 2-UP, the double sided printing, and the transverse direction) of the three print setting items 123B-2.
(f3) The main image 431d (the longitudinal direction main image 123B-3) that corresponds to the setting condition after the change.
(f4) The sub image 432b (the 2-UP double-side sub image 123B-3) that is obtained by reducing the number of pixels of the main image 431c (the 2-UP double-side main image 123B-3) before the setting condition of the binding direction is changed.

In this case, the default print setting item 123B-2 (the layout) of the tab C430 corresponds to a specific example of a "selection item" of the present invention. Further, (b3) corresponds to a specific example of a "second image" of the present invention. Further, the display screen data Id that includes the above-described (f1)-(f4) corresponds to a specific example of "second display screen data" of the present invention.

Figure 13:
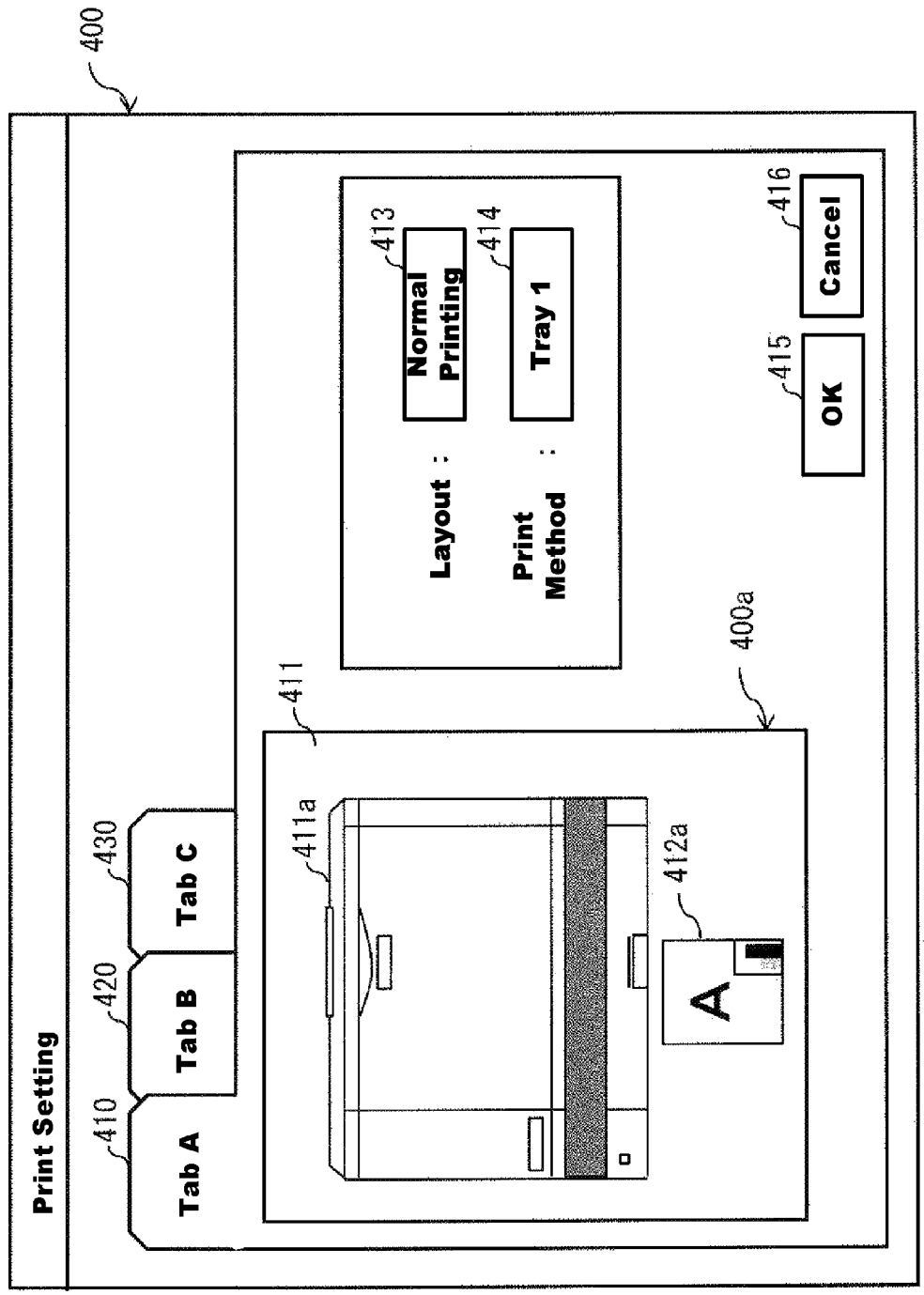
FIG. 13 illustrates an example of a printer driver UI screen.

FIG. 13 illustrates an example of an image in the display output I/F 140. FIG. 13 illustrates an image 411 in which, in the printer driver UI screen 400 illustrated in FIG. 7, the sub window 400b is omitted and the main image 411a and the sub image 412a are included in the main window 400a. That is, it is different from that described above in that the place where the sub image 412a is displayed has been moved to the main window 400a.

When the tab B420 is opened, the sub window 400b is omitted, and an image 421 that includes the main image 421a and the sub image 422a is displayed in the main window 400a. That is, it is different from that described above in that the place where the sub image 422a is displayed has been moved to the main window 400a. When the tab C430 is opened, the sub window 400b is omitted, and an image 431 that includes the main image 411a and the sub image 432a is displayed in the main window 400a. That is, it is different from that described above in that the place where the sub image 432a of the binding direction is displayed has been moved to the main window 400a.

In this case, the image producing part 113c generates the display screen data Id that includes the main image 411a and the sub image 412a at the position of the main window 400a.

[Operation]

Next, operation procedures of the information processing apparatus 100 are described.

(Tabbing is not Involved)

Figure 14:
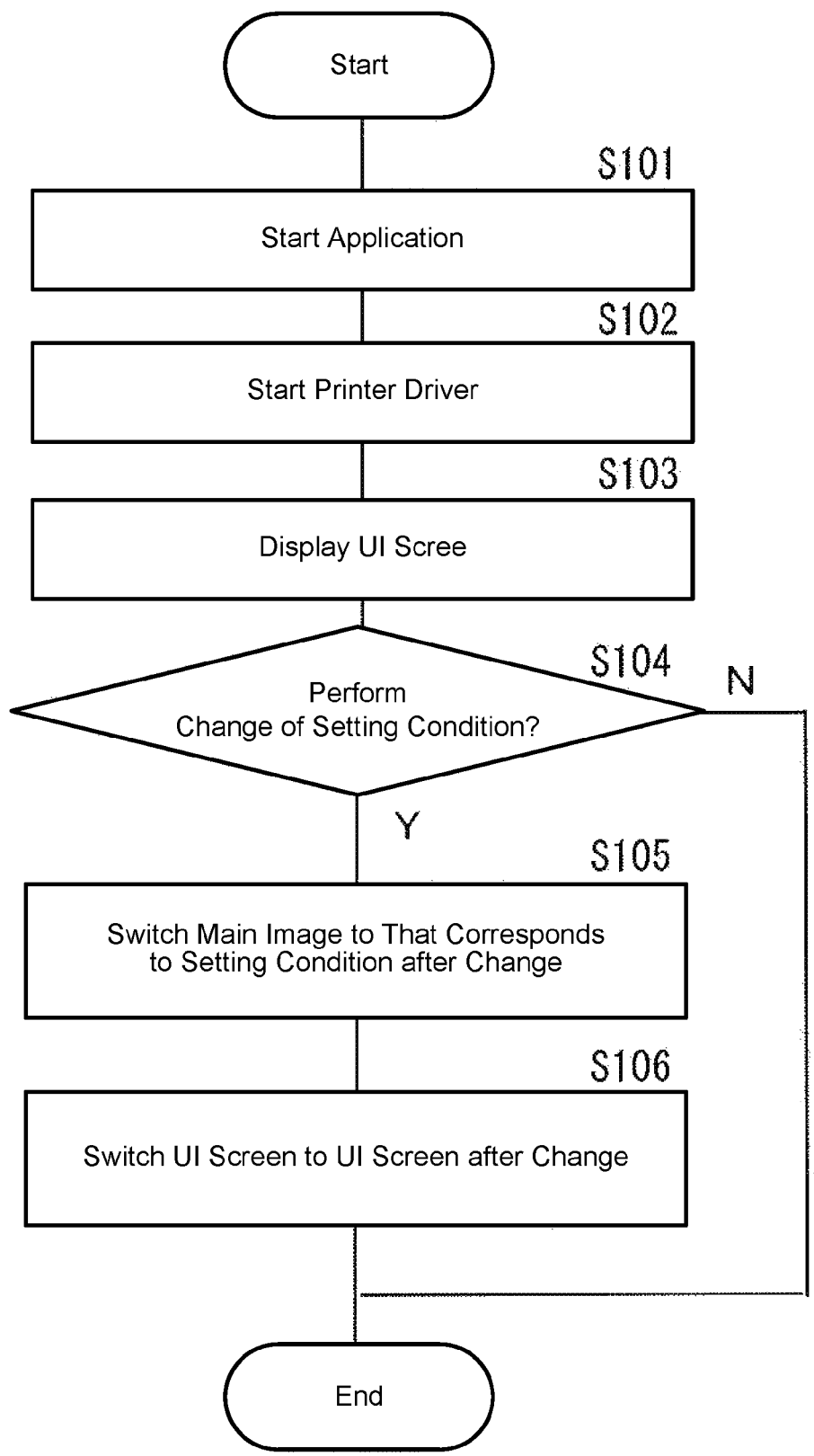
FIG. 14 illustrates an example of print operation procedures in an information processing apparatus.

FIG. 14 illustrates an example of operation procedures of the information processing apparatus 100. First, a user uses the operation input I/F 130 to input an instruction to start the application 122. Then, the controller 110 loads and starts the application 122 that is stored in the memory 120 (S101). Next, the user uses the operation input I/F 130 to input an instruction to start the printer driver 123. Then, the controller 110 loads and starts the printer driver 123 that is stored in the memory 120 (S102). As a result, in the screen of the display output I/F 140, for example, the screen that includes the printer driver UI screen 400 as illustrated in FIG. 6 is displayed (S103). In this case, by default, the tab A410 is opened.

Next, the controller 110 determines whether or not the user has performed a change of a setting condition in a print setting item 123B-2 that is associated with the tab A410 and is a specific item (S104). When the user has not performed any change of the setting condition, the controller 110 does not perform an image change. On the other hand, when the user has performed a change of the setting condition, the controller 110 generates display screen data Id that includes, at the display position of the main image 411a of the tab A410, in place of the main image 411a, a main image 411b that corresponds to the setting condition after the change. That is, the controller 110 switches the main image 411a displayed in the main window 400a to the main image 411b that corresponds to the setting condition after the change (S105).

When the user changes a setting condition for a print setting item 123B-2 that is the same as the print setting item 123B-2 of the main image 411a, the controller 110 generates display screen data Id that includes the main image 411b that corresponds to the print setting item 123B-2 that is the same as the print setting item 123B-2 of the main image 411a. When the user changes a setting condition for a print setting item 123B-2 that is different from the print setting item 123B-2 of the main image 411a, the controller 110 generates display screen data Id that includes the main image 411b that corresponds to the print setting item 123B-2 that is different from the print setting item 123B-2 of the main image 411a.

Next, the controller 110 outputs the generated display screen data Id to the display output I/F 140. As a result, the UI screen of the display output I/F 140 is switched to the UI screen after the change (S106).

(Tabbing is Involved)

Figure 15:
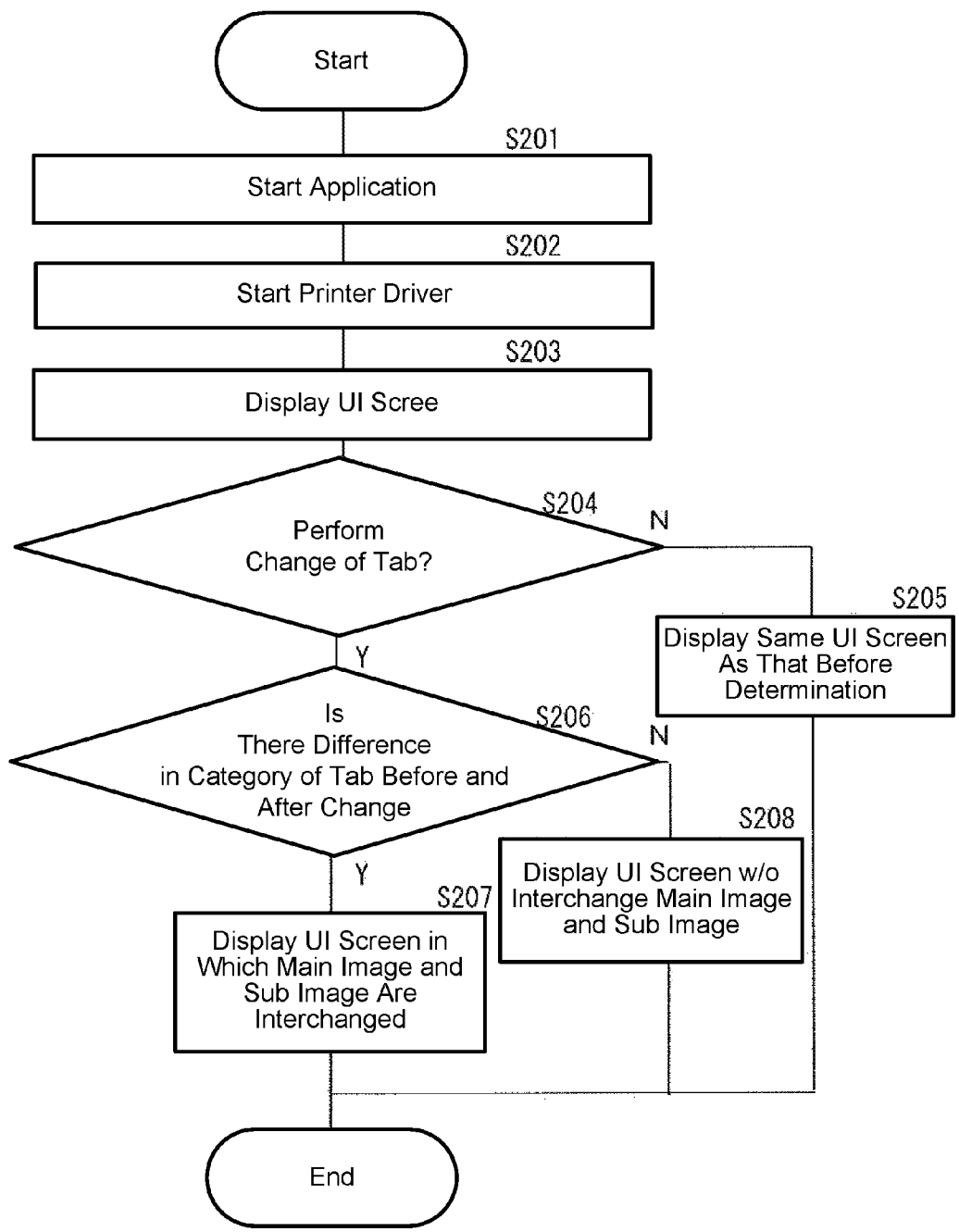
FIG. 15 illustrates another example of print operation procedures in the information processing apparatus.

FIG. 15 illustrates an example of operation procedures of the information processing apparatus 100. First, a user uses the operation input I/F 130 to input an instruction to start the application 122. Then, the controller 110 loads and starts the application 122 that is stored in the memory 120 (S201). Next, the user uses the operation input I/F 130 to input an instruction to start the printer driver 123. Then, the controller 110 loads and starts the printer driver 123 that is stored in the memory 120 (S202). As a result, in the screen of the display output I/F 140, for example, the screen that includes the printer driver UI screen 400 as illustrated in FIG. 6 is displayed (S203). In this case, by default, the tab A410 is opened.

Next, the controller 110 determines whether or not the user has performed a change of tab to a tab (for example, the tab C430) that is different from the tab A410, which is the specific item (S204). As a result, when the user has not performed such a change, the controller 110 does not perform any change. In this case, the display output I/F 140 displays the same UI screen as before the determination is performed (S205). On the other hand, when the user has performed such a change, the controller 110 determines whether or not there is a difference in the category of the tab before and after the change (S206).

As a result, when there is a difference in the category of the tab before and after the change, the controller 110 reads out, from the default setting information 123C-2, a plurality of print setting items 123B-2 associated with the tab after the change (for example, the tab C430) and the default setting conditions (for example, the normal printing, the single sided printing, and the transverse direction) of the print setting items 123B-2 associated with the tab after the change (for example, the tab C430). The controller 110 further reads out from the library 123B a main image 431a (for example, the normal printing main image 123B-3) that corresponds to the default print setting item 123B-2 of the tab after the change (for example, the tab C430). The controller 110 further reads out from the library 123B a sub image 432a (for example, the tray 1 sub image 123B) that is obtained by reducing the number of pixels of a main image 411a (for example, the tray 1 main image 123B-3) that was displayed in the main window 400a of the tab A410 that had been opened until immediately before the change. It is also possible that the controller 110 reads out from the library 123B a main image 431a (for example, the normal printing main image 123B-3) that is obtained by increasing the number of pixels of a sub image 412a (for example, the normal printing sub image 123B-3) of the tab A410 that had been opened until immediately before the change.

Next, the controller 110 generates display screen data Id that includes the main image 431a and the sub image 432a. That is, the controller 110 generates the display screen data Id in which the images of the main window 400a and the sub window 400b are interchanged. Thereafter, the controller 110 outputs the generated display screen data Id to the display output I/F 140. As a result, the display output I/F 140 displays a UI screen that includes the main image 431a and the sub image 432a. That is, the display output I/F 140 displays the UI screen in which the images of the main window 400a and the sub window 400b are interchanged (S207).

Further, as a result of the determination, when there is a difference in the category of the tab before and after the change, the controller 110 either uses the main image 431a of the tab C340 that had been opened until immediately before the change as the main image 421a, or reads out from the library 123B a main image 421a that has the same design as the main image 431a of the tab C340 that had been opened until immediately before the change. The controller 110 further either uses the sub image 432a of the tab C340 that had been opened until immediately before the change as the sub image 422a, or reads out from the library 123B a sub image 422a that has the same design as the sub image 432a of the tab C340 that had been opened until immediately before the change. That is, the controller 110 does not change the images of the main window 400a and the sub window 400b.

Next, the controller 110 generates display screen data Id that includes the main image 421a and the sub image 422a. That is, the controller 110 generates the display screen data Id in which the images of the main window 400a and the sub window 400b are not interchanged. Thereafter, the controller 110 outputs the generated display screen data Id to the display output I/F 140. As a result, the display output I/F 140 displays the UI screen in which the images of the main window 400a and the sub window 400b are not interchanged (S208).

[Effects]

Next, an effect of the information processing apparatus 100 of the present embodiment is described.

Conventionally, in an information processing apparatus, when a user uses a printer driver to change a print setting, an image corresponding to the change of the print setting is displayed on a UI screen of the printer driver. However, in the conventional method, even when the user has changed the print setting, it is not easy for the user to intuitively understand the change of the print setting.

On the other hand, in the information processing apparatus 100 of the present embodiment, the images 123B-3 that is displayed in the main window 400a is changed to an image 123B-3 that corresponds to a selection item that is selected by the user. When the selection item is a print setting item 123B-2, the image 123B-3 that is displayed in the main window 400a is changed to the image 123B-3 that corresponds to the print setting item 123B-2 that is selected by the user. When the selection item is a tab, the image 123B-3 that is displayed in the main window 400a is changed to the image 123B-3 that corresponds to the print setting item 123B-2 that is associated with the tab that is selected by the user. As a result, the user can easily understand the change of the print setting on the screen.

<2. Modified Embodiment>

In the following, a modified embodiment of the image forming system of the above embodiment is described. In the following, components that are the same as in the above embodiment are denoted using the same reference numeral symbols as in the above embodiment. Further, components that are different from those in the above embodiment are mainly described, and description about the components that are the same as in the above embodiment is omitted as appropriate.

Figure 16:
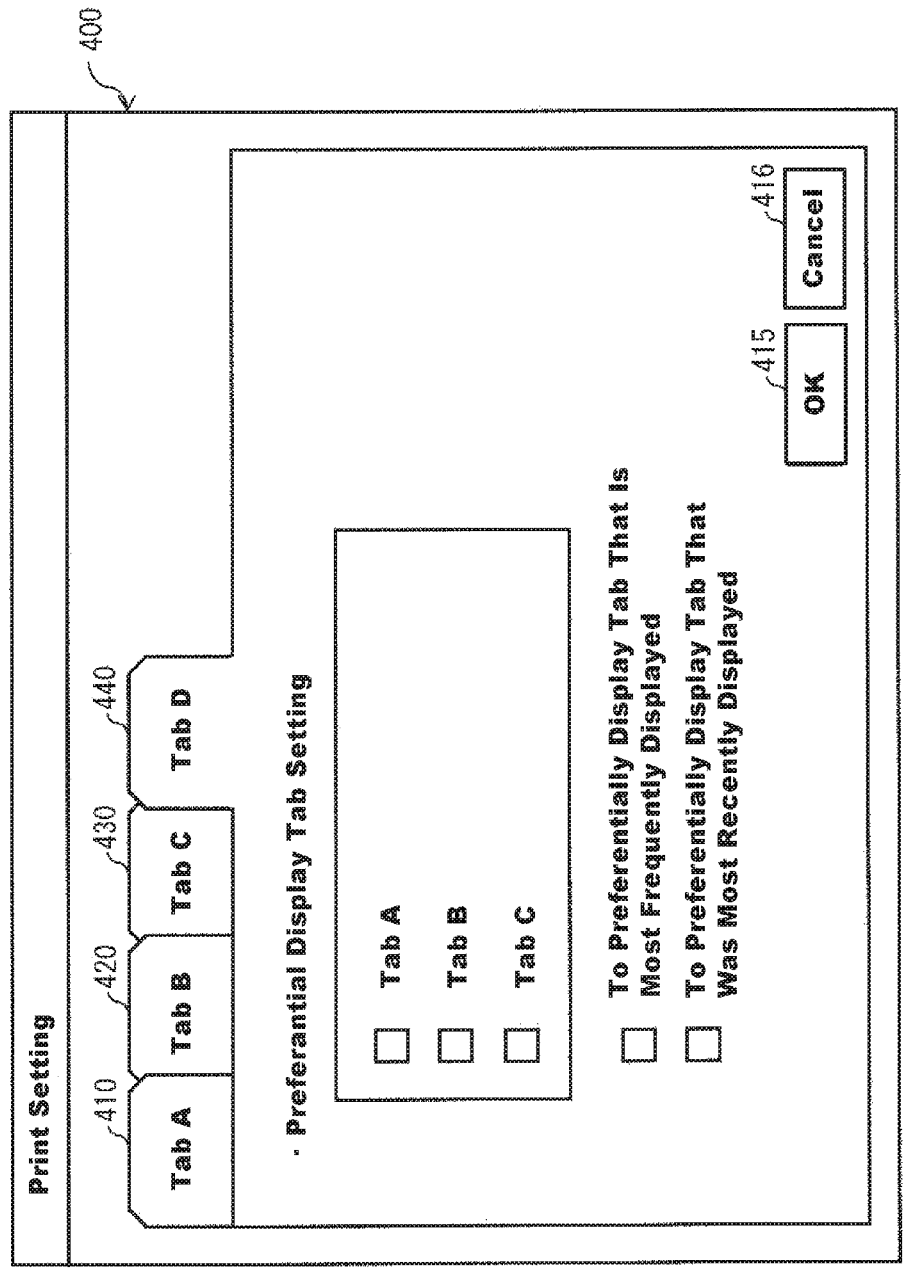
FIG. 16 illustrates an example of a printer driver UI screen.

FIG. 16 illustrates an example of an image in the display output I/F 140. In the present modified embodiment, in the printer driver UI screen 400 that is described in FIGS. 7-13, a tab D440 has been added. The tab D440 is for defining preferential display of a tab. The tab D440, for example, is assigned with a category that is referred to as "preferential display." Five checkboxes that can be selected by a user by operating the operation input I/F 130 are provided in the tab D440 as preferential display tab settings. The five checkboxes include a checkbox for preferentially displaying the tab A, a checkbox for preferentially displaying the tab B, a checkbox for preferentially displaying the tab C, a checkbox for preferentially displaying a tab of a high frequency display, and a checkbox for preferentially displaying a tab that is previously last displayed.

Figure 17:
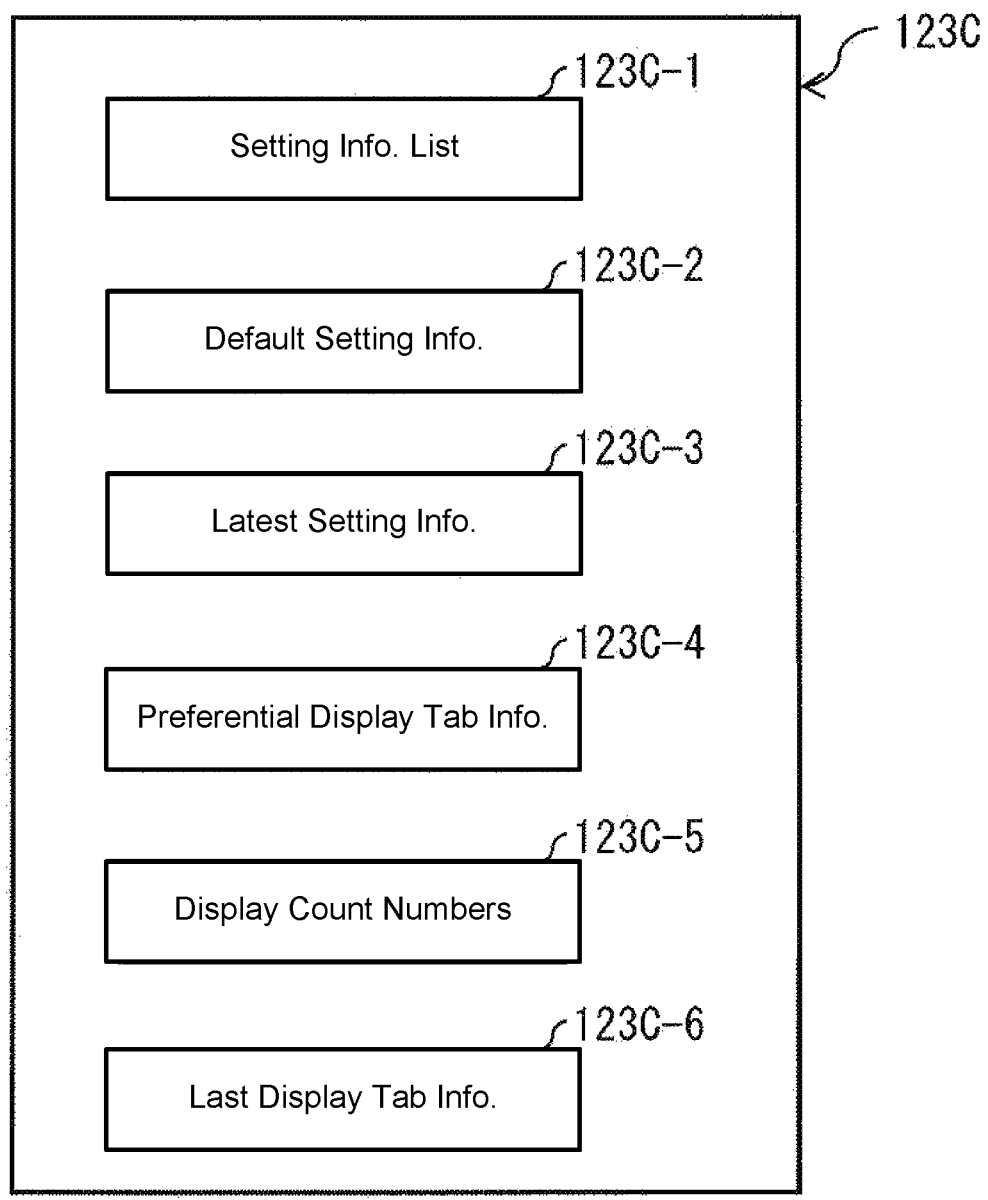
FIG. 17 illustrates an example of setting information.

FIG. 17 illustrates an example of a schematic configuration of the setting information 123C. In the case where the tab D440 is provided, for example, in addition to the setting information list 123C-1, the default setting information 123C-2 and the latest setting information 123C-3, the setting information 123C further includes preferential display tab information 123C-4, display count numbers 123C-5 and last display tab information 123C-6.

The preferential display tab information 123C-4 includes an item that is preferentially displayed in the specific item in the default setting information 123C-2 when the printer driver UI screen 400 is displayed in the screen of the display output I/F 140. The preferential display tab information 123C-4 includes, for example, information about which one of the five checkboxes that are included in the tab D440 is checked. when one of the checkboxes of the tab A410, the tab B420 and the tab C430 is checked, the preferential display tab information 123C-4 includes, for example, the tab information 123B-1 of the tab that is checked. When "to preferentially display a tab that is most frequently displayed" is checked, the preferential display tab information 123C-4 includes, for example, information indicating that "to preferentially display a tab of a high frequency display" is checked. When "to preferentially display a tab that was most recently displayed" is checked, the preferential display tab information 123C-4 includes, for example, information indicating that "to preferentially display a tab that was most recently displayed" is checked.

The display count numbers 123C-5 include, for each of the tabs (the tab A410, the tab B420, the tab C430 and the tab D440), a number of times that the tab has been opened. When a display image that includes the printer driver UI screen 400 is displayed in the display output I/F 140, when any one of the tabs is selected by an operation of the operation input I/F 130 by a user, the information registering part 113d obtains from the input controller 111 the tab information 123B-1 of the tab that is selected, and add 1 to a display count number that corresponds to the tab information 123B-1, the display count number being one of the display count numbers 123C-5 in the memory 120.

When the printer driver UI screen 400 is closed, the last display tab information 123C-6 includes the tab information 123B-1 of the tab that was displayed in the printer driver UI screen 400. When an image that includes the printer driver UI screen 400 is displayed in the display output I/F 140 by an operation of the operation input I/F 130 by a user, the information registering part 113d the information registering part 113d obtains from the input controller 111 the tab information 123B-1 of the tab that is displayed in the display output I/F 140, and writes the tab information 123B-1 to the last display tab information 123C-6 in the memory 120.

Next, an example of display procedures of the printer driver UI screen 400 according to the present modified embodiment is described. The controller 110 reads out, from the preferential display tab information 123C-4 in the memory 120, information (preferential display information) about which one of the checkboxes is checked. In the case where information indicating that one of the tab A, the tab B and the tab C is checked is read out from the preferential display tab information 123C-4 in the memory 120, the controller 110, for example, sets the tab corresponding to the information to the specific item. In the case where information indicating that "to preferentially display a tab of a high frequency display" is checked is read out from the preferential display tab information 123C-4 in the memory 120, the controller 110 identifies a tab that has the largest display count number among the display count numbers 123C-5, and sets the identified tab to the specific item. In the case where information indicating that "to preferentially display a tab that was most recently displayed" is checked is read out from the preferential display tab information 123C-4 in the memory 120, the controller 110 reads out the tab information 123B-1 from the last display tab information 123C-6 and sets the tab that is read out to the specific item.

When reading out the tab information 123B-1 from the preferential display tab information 123C-4 in the memory 120 has failed, the controller 110 judges that the preferential display tab information 123C- is not stored in the preferential display tab information 123C-4. In this case, the controller 110 reads out the tab information 123B-1 that corresponds to the specific item that is included in the default setting information 123C-2.

The image producing part 113c produces the display screen data Id that includes the printer driver UI screen 400, according to a print request received from a user via the operation input I/F 130. The image producing part 113c generates the display screen data Id that includes a plurality of items (specifically, at least one of the tab information 123B-1 and the print setting item 123B-2), which are related to the setting conditions, and an image 123B-3 that corresponds to a tab that is identified from the preferential display tab information 123C-4 or the default setting information 123C-2. The image producing part 113c outputs the generated display screen data to the communication controller 114.

In the present modified embodiment, a display screen is generated that includes an image 123B-3 that corresponds to a tab that is identified from the preferential display tab information 123C-4. As a result, operation burden of a user can be reduced.

Figure 18:
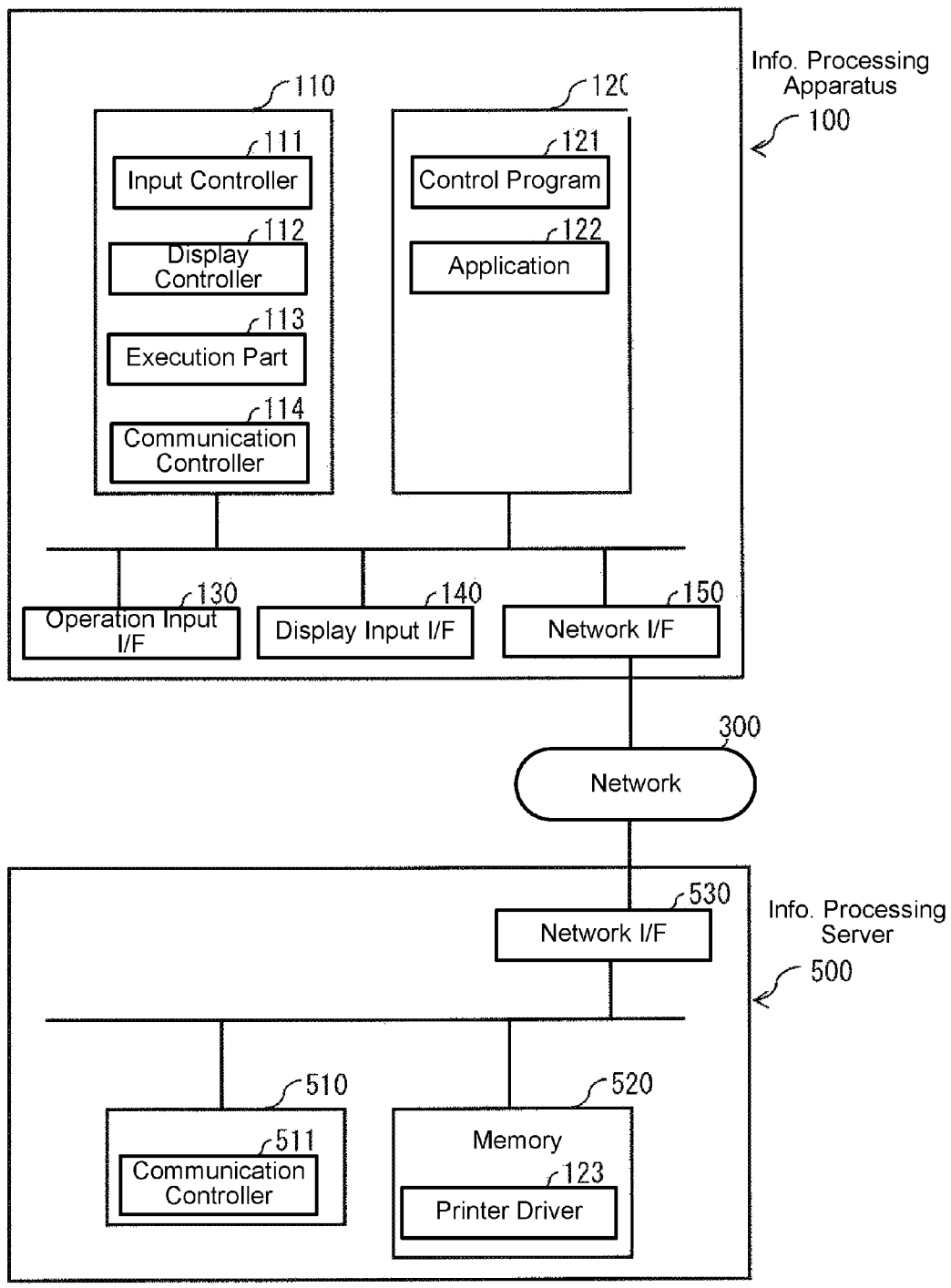
FIG. 18 illustrates an example of an information processing apparatus and an information processing server.

FIG. 18 illustrates an example of a schematic configuration of the information processing apparatus 100 and an information processing server 500. The information processing server 500 is configured to be able to communicate with the information processing apparatus 100 on the network 300. The information processing server 500 includes, for example, a controller 510, a memory 520 and a network I/F 530. The controller 510 includes a communication controller 511. The memory 520 includes a printer driver 520. The information processing server 500 is realized by a computer or a machine, and, for example, is formed by a server device.

The information processing server 500 corresponds to a specific example of an "information processing server" of the present invention.

The controller 510 controls the entire information processing server 500. The controller 510 receives various requests (for example, a connection request and the like) from an external device such as the information processing apparatus 100 via the network I/F 530. The controller 510 generates various responses (for example, a connection response and the like) according to a request from the external device such as the information processing apparatus 100. The controller 510 transmits the generated various responses via the network I/F 530 to the external device such as the information processing apparatus 100. When there is a request of the printer driver 123 from the external device such as the information processing apparatus 100, the controller 510 further reads out from the memory 520 the printer driver 123, and transmits the printer driver 123 via the network I/F 530 to the external device such as the information processing apparatus 100.

In the present modified embodiment, the printer driver 520 in the memory 520 is read out according to a request from the external device such as the information processing apparatus 100, and is transmitted to the external device such as the information processing apparatus 100. As a result, the external device such as the information processing apparatus 100 that is capable of communicating with the information processing server 500 obtains the printer driver 520 from the information processing server 500. Thereby, a change in the print setting can be easily understood on a screen.

The series of the processes that are described in the above embodiment and the modified embodiment can be performed using hardware (circuit) or software (program). When the series of the processes are performed using software, the software is formed of a group of programs for allowing a computer to execute the respective functions. The program, for example, may be used by being incorporated into the computer in advance, or may be used by being installed into the computer from a network or from a recording medium.

What is claimed is:

1. An information processing apparatus having a printer driver, comprising:
    a storage part that stores tab information that contains information of a plurality of tabs and main image information corresponding to each tab, the plurality of tabs including a first setting tab and a second setting tab, the main image information including a first image and a second image that correspond to and set as respective main images of the first setting tab and the second setting tab, respectively;
    a display part that displays on a screen the first image, the second image, the first setting tab and the second setting tab, both of the first and second images being displayed on the first setting tab and the second setting tab, the first and second setting tabs being layered and one of the setting tabs, which are selected by a user, the selected one of the first and second setting tabs being shown on a top layer and the other of the setting tabs being shown on a lower layer;
    a control part that determines
        the first image as the main image and the second image as a sub image when the first setting tab is selected by the user, and
        the second image as the main image and the first image as the sub image when the second setting tab is selected by the user, and
    a display switching part that
        switches the top layer from the first setting tab to the second setting tab when the second setting tab is selected on the screen where the first setting tab is on the top layer, wherein the second image is displayed as the main image based on the tab information and the first image is displayed as the sub image in the second setting tab,
        switches the top layer from the second setting tab to the first setting tab when the first setting tab is selected on the screen where the second setting tab is on the top layer, wherein the first image is displayed as the main image based on the tab information and the second image is displayed as the sub image in the first setting tab.

2. The information processing apparatus of claim 1, wherein
    the main image is displayed bigger than the sub image on the screen.

3. The information processing apparatus of claim 1, wherein
    the first image is an image that relates to apparatus information and the first setting tab is an item that relates to apparatus settings,
    the second image is an image that relates to print settings and the second setting tab is an item that relates to the print settings.

4. The information processing apparatus of claim 1, wherein
    display priorities are assigned to all of the setting tabs, being ranked from low to high, and
    one tab that is assigned with a higher priority is displayed prior to another tab that is assigned with a lower priority.

5. The information processing apparatus of claim 1, wherein
    one of the setting tabs that was displayed at the most lately is displayed first than the other tabs.

6. A display method, comprising:
    storing in a storage part tab information that contains information of a plurality of tabs and main image information corresponding to each tab, the plurality of tabs including a first setting tab and a second setting tab, the main image information including a first image and a second image that correspond to and set as respective main images of the first setting tab and the second setting tab, respectively,
    displaying by a display part the first image, the second image, the first setting tab and the second setting tab, both of the first and second images being displayed on the first setting tab and the second setting tab, the first and second setting tabs being layered and one of the setting tabs, which is selected by a user, the selected one of the first and second setting tabs being shown on a top layer and the other of the setting tabs being shown on a lower layer,
    receiving a selection made by the user, and
    selecting the first image as the main image when the first setting tab is selected by the user on the screen where the second setting tab is on the top layer, and the second image as the main image when the second setting tab is selected by the user where the first setting tab is on the top layer,
    switching the top layer from the first setting tab to the second setting tab when the second setting tab is selected on the screen where the first setting tab is on the top layer, wherein the second image is displayed as the main image based on the tab information and the first image is displayed as the sub image in the second setting tab, and switching the top layer from the second setting tab to the first setting tab when the first setting tab is selected on the screen where the second setting tab is on the top layer, wherein the first image is displayed as the main image based on the tab information and the second image is displayed as the sub image in the first setting tab.

7. The display method by the printer drive of claim 6, wherein the main image is displayed bigger than the sub image on the screen.

8. The display method by the printer drive of claim 6, wherein the first image is an image that relates to apparatus information and the first setting item is an item that relates to apparatus settings, the second image is an image that relates to print settings and the second setting item is an item that relates to the print settings.

9. The display method by the printer drive of claim 6, wherein display priorities are assigned to all of the tabs, and one of the setting tabs that is assigned with a higher priority is displayed prior to the other setting tab that is assigned with a lower priority.

10. The display method by the printer drive of claim 6, further comprising:

displaying first one of the setting tabs that was displayed at the most lately than the other tabs.

* * * * *